United States Patent
Bae et al.

(10) Patent No.: US 7,906,096 B2
(45) Date of Patent: Mar. 15, 2011

(54) CHIRAL INORGANIC-ORGANIC COMPOSITE POROUS MATERIAL AND METHOD FOR PREPARING THE SAME

(75) Inventors: Dong Han Bae, Seongnam-si (KR); Chang Ick Lee, Seoul (KR); Seung Kwon Yang, Gwangmyeong-si (KR); Kyoung Tai No, Seoul (KR); Suk Kyu Chang, Gwacheon-si (KR); Byung Hee Seo, Gwacheon-si (KR); Jung Sup Kim, Seoul (KR); Jong Won Kim, Daejeon (KR); Mee Kyung Song, Seoul (KR)

(73) Assignee: Chirolite, Suwon-si (KR)

( * ) Notice: Subject to any disclaimer, the term of this patent is extended or adjusted under 35 U.S.C. 154(b) by 1164 days.

(21) Appl. No.: 10/585,307

(22) PCT Filed: Jan. 7, 2005

(86) PCT No.: PCT/KR2005/000039
§ 371 (c)(1),
(2), (4) Date: Jul. 6, 2006

(87) PCT Pub. No.: WO2005/066074
PCT Pub. Date: Jul. 21, 2005

(65) Prior Publication Data
US 2009/0018334 A1    Jan. 15, 2009

(30) Foreign Application Priority Data
Jan. 7, 2004  (KR) .................. 10-2004-0000896

(51) Int. Cl.
*D01F 9/12*  (2006.01)
(52) U.S. Cl. .................. 423/447.2; 544/225; 428/405
(58) Field of Classification Search .................. 544/225
See application file for complete search history.

(56) References Cited

FOREIGN PATENT DOCUMENTS

| KR | 10-2001-0069803 | 7/2001 |
|---|---|---|
| WO | 01/38292 A2 | 5/2001 |
| WO | 03/037840 A1 | 5/2003 |

OTHER PUBLICATIONS

Weckhuysen et al. J. Phys. Chem. 1996, 100, 9456-9461.*
L. Funza et al., "Host/guest interactions in nanoporous materials I. The embedding of chiral salen manganese(III) complex into mesoporous silicates", *Journal of Molecular Catalysis*, A: Chemical, 123, 1997, pp. 179-187.
Geong-Joon Kim and Ji-Hoon Shin, "The catalytic activity of new chiral salen complexes immobilized on MCM-41 by multi-step grafting in the asymmetric epoxidation", *Tetrahedron Letters*, vol. 40, 1999, pp. 6827-6830.
Mark E. Davis, "Ordered porous materials for emerging applications", *Nature*, vol. 417, Jun. 20, 2002, pp. 813-821.

(Continued)

*Primary Examiner* — Melvin C Mayes
*Assistant Examiner* — Yun Qian
(74) *Attorney, Agent, or Firm* — Sughrue Mion, PLLC

(57) ABSTRACT

The present invention provides a chiral inorganic-organic composite porous material in which cationic chiral organic molecules are present as charge-balancing cations in a porous material containing charge-balancing cations, as well as a method for preparing the same by an ion exchange process. The chiral inorganic-organic composite porous material according to the present invention is excellent in stability, selectivity and durability, and thus, will be useful as a chiral-selective catalyst or a material of separating an isomeric mixture.

5 Claims, 23 Drawing Sheets

OTHER PUBLICATIONS

M. W. Anderson et al., "Structure of the microporous titanosilicate ETS-10", *Nature*, vol. 367, Jan. 27, 2004, pp. 347-353.

M. M. J. Treacy & J. M. Newsam, "Two new three-dimensional twelve-ring zeolite frameworks of which zeolite beta is a disordered intergrowth", *Nature*, vol. 367, Jan. 27, 2004, pp. 249-251.

Jung Soo Seo, et al., "A homochiral metal-organic porous material for enantioselective separation and actalysis", *Nature*, vol. 404, Apr. 27, 2000, pp. 982-986.

Carla Thoelen et al., "The use of M42S materials in chiral HPLC", *Chem. Commun.*, 1999, pp. 1841-1842.

M.J. Alcón et al., "New Mn(II) and Cu(II) chiral $C_2$-multdentate complexes immobilized in zeolites (USY, MCM41) Reusable catalysts for selective oxidation reactions", *Journal of Molecular Catalysis*, A: Chemical, 194, 2003, pp. 137-152.

Kenneth C. W. Chong et al., "Use of Chirally Modified Zeolites and Crystals in Photochemical Asymmetric Synthesis", *J. Am. Chem. Soc.*, vol. 124, No. 12, 2002, pp. 2858-2859.

C.J. Kepert et al., "A Versatile Family of Interconvertible Microporous Chiral Molecular Frameworks: The First Example of Ligand Control of Network Chirality", *J. Am. Chem. Soc.*, vol. 122, No. 21, 2000, pp. 5158-5168.

Lev Z. Vilenchik et al., "Protein Crystals as Novel Microporous Materials", *J. Am. Chem. Soc.*, vol. 120, No. 18, 1998, pp. 4290-4294.

Banu Kesanli and Wenbin Lin, *Coordination Chemistry Reviews*, vol. 246, 2003, pp. 305-326.

\* cited by examiner

CHIRAL INORGANIC-ORGANIC COMPOSITE POROUS MATERIAL AND METHOD FOR PREPARING THE SAME

This is a national stage application of PCT/KR2005/000039 filed on Jan. 7, 2005, which claims priority from Korean patent application 10-2004-0000896 filed Jan. 7, 2004, all of which are incorporated herein by reference.

TECHNICAL FIELD

The present invention relates to a chiral inorganic-organic composite porous material which can be used, for example, as a chiral-selective catalyst or a material of separating an isomeric mixture, as well as a preparation method thereof.

BACKGROUND ART

Materials used as intermediates for preparing drugs, insecticides, agricultural chemicals, cosmetics, food nutrients, additives, perfumes and compounds often exist only as a chiral pair. However, only one isomer of the chiral pair shows the activity of acting as a useful material, and the other isomer is inactive or even shows toxicity. Thus, currently, there is a continued need to obtain optically pure enantiomers. Also, researchers in the academic or industrial fields now concentrate much effort either on finding more reliable and effective reaction mechanisms for synthesizing optically pure compounds or on separating useful active materials from inactive or toxic compounds.

Meanwhile, porous materials with large surface area, which indicate metal oxide, metal salt or organic-metal coordination polymer compounds or materials containing organic network structures, are currently known to play an important role in the recognition and adsorptive transport of molecules required in biological procedures and industrial processes, and the separation of gaseous molecules [Davis, M. E. Davis *Nature* 2002, 417, 813; Kesanli B.; Lin W., *Coordination Chemistry Reviews*, 2003, 246, 305].

A typical example of these porous materials is zeolite, a porous solid oxide consisting of aluminum and silicon. Zeolite has cavities and tunnels with regular open structures and is excellent in durability, reproducibility and thermal stability, and its physical and chemical properties can be controlled due to its structural characteristics. Thus, it has been used mainly in wide applications, including catalysts, adsorbents for separation, and gas storage containers. Also, zeolite has advantages in that it makes ion exchange processes very easy, is inexpensive, and causes little or no by-products. Accordingly, scientists now make efforts to develop not only novel uses of zeolite, including applications to chemical or electrical sensors or selective membranes, and stationary phases for high-resolution liquid chromatography, but also new zeolite materials with larger cavities and tunnels.

Even though porous materials including zeolite have many structural advantages as described above, only a very small number of chiral porous framework materials were prepared.

For example, protein crystals crosslinked so as to have chiral characteristics inherent in protein molecules while maintaining high porosity were prepared, and their use allowed highly successful separation of racemic compounds [Vilenchik, Lez Z.; Griffith, J. P.; Clair, N. St.; Navia, M. A.; Margolin, A. L. *J. Am. Chem. Soc.* 1998, 120, 4290]. Also, metal organic framework(MOF)-type solids were prepared by coordinating metal ions to chiral organic linkage units, and these solids have open-framework structures with chiral cavities and tunnels and were seen to be sufficiently applicable as catalysts or adsorbents in the selective synthesis of isomers [Kepert, C. J.; Prior, T. J.; Rosseinsky, M. J. *J. Am. Chem. Soc.* 2000, 122, 5158; Seo, J. S.; Whang, D.; Lee, H.; Jun, S. I.; Oh, J.; Jeon, Y. J.; Kim, K. *Nature* 2000, 404, 982]. However, the highly porous organic or organic-metal framework structures as described above have disadvantages in that they require many costs for preparation, have a weak framework structure due to hydrogen bonds or nonbonded interactions caused by the overlapping of $\pi$-$\pi$ electron clouds, and have poor thermal stability.

Unlike these organic or organic-metal framework structures, in the case of zeolite, a combination of large surface area and phase caused by strong covalent bonds between Si—O and Al—O is seen to be a factor of determining isomer selectivity and durability. However, since preparing chiral zeolite directly from metal oxide encounters limitations, there is only a very small number of reports on the selective synthesis or separation of isomers by chiral zeolite.

For example, there are reports on the synthesis and separation of isomers by aluminosilicate zeolite β and titanosilicate ETS-10. However, these two zeolite materials have very dense crystals grown therein, and thus, maintain pure properties of isomers only at very small crystal lattice layers [Treacy, M. M. J.; Newsam, J. M. *Nature* 1988, 332, 249; Anderson, M. W.; Terasaki, O.; Ohsuna, T.; Philippou A.; Mackay, S. P.; Ferreira, A.; Rocha, J.; Lidin, S. *Nature* 1994, 367, 347].

For these reasons, attempts are now made to prepare inorganic-organic composite porous materials by binding or incorporating chiral organic molecules into porous inorganic materials other than making zeolite-like porous materials themselves chiral. The preparation of the inorganic-organic composite porous materials has received a great interest, since it is performed in various operational conditions as compared to the case of organic polymers in view of the selection of temperature or solvents, etc. Here, as the inorganic supports for binding and incorporating the chiral molecules, zeolites have been used.

As a modified method using zeolite, a method of binding chiral molecules to silane groups on the zeolite surface by covalent bonds has been widely adopted. This method provided an opportunity to synthesize inorganic-organic composite materials. There are several reports that non-chiral zeolites or zeolite-like materials were chiral-functionalized by this method.

Mezoporous silica material M41S, which can be used as a stationary phase for high-performance liquid chromatography (HPLC), is a modified material obtained by covalently binding chiral molecules to a non-chiral surface. This modified material appeared to be a successful solution but showed very low efficiency [Thoelen, C.; van der Walle, K.; Vankelecom, I. F. J.; Jacobs, P. A. *Chem. Commun.* 1999, 184]. In addition, there is a report on a chiral inorganic-organic composite catalyst obtained by covalently binding transition metal complexes or organic molecules to zeolite or silica. The physical stability of this catalyst was actually improved but it had no enantiomer selectivity [Alcn, M. J.; Corma, A.; Iglesias, M.; Snchez, F. *J. Mol. Cat. A: Chem.* 2003, 194, 137]. Furthermore, there was chiral Y-zeolite which is a chiral-selective catalyst acting in a solution-phase photoreaction producing a racemic mixture. This chiral-selective catalyst was obtained by coordinating chiral molecules to charge-balancing metal cations and showed a chiral selectivity of more than 90% [Chong, K. C. W.; Sivaguru, J.; Shichi, T.; Yoshimi, Y.; Ramamurthy, V.; Scheffer, J. R. *J. Am. Chem. Soc.* 2002, 124, 2858].

However, the above-described methods, i.e., the method of covalently binding chiral molecules to the zeolite surface or the method of coordinating chiral molecules to charge-balancing metal cations, encounter a difficulty in selecting a solvent and have the limitation of insufficient structural stability, resulting in the leakage of chiral molecules into solution.

Accordingly, there is now a need for the development of chiral porous materials which can be used, for example, as chiral-selective catalysts or materials of separating isomeric mixtures.

DISCLOSURE OF THE INVENTION

Figure 1:
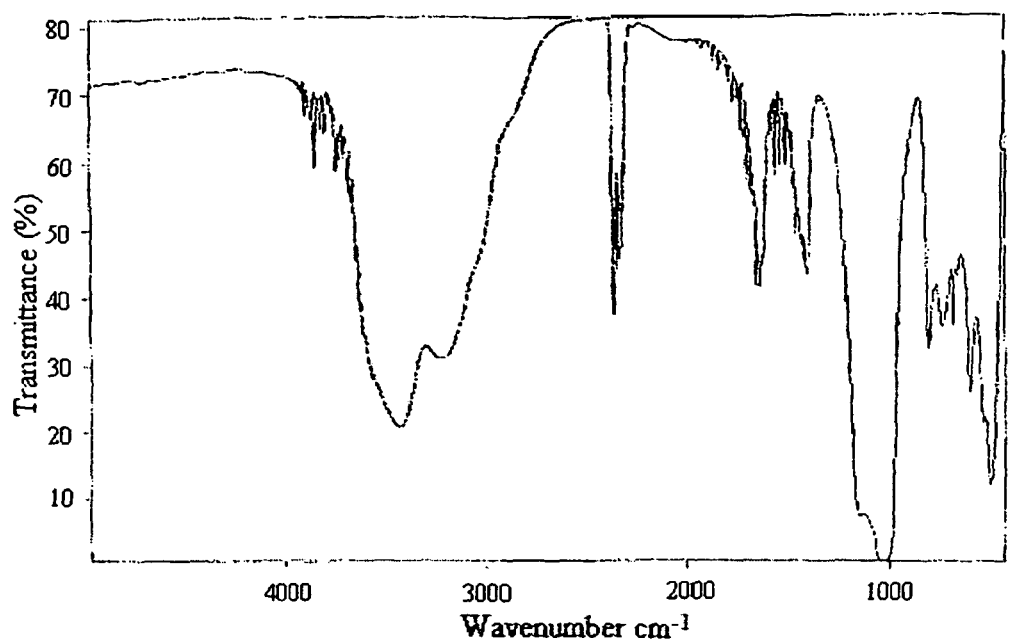
FIGS. 1, 3, 5, 7, 9, 11, 13, 15, 17, 19, 21, 23, 25, 27, 29, 31, 33 and 35 show the results of IR analysis on chiral inorganic-organic composite porous materials prepared in Examples 1-18, respectively.

The present inventors have found that the use of a method of introducing chiral molecules into the charge-balancing cations of a porous material, such as zeolite or a zeolite-like material having charge-balancing cations, by an ion exchange process, allows a chiral organic-inorganic composite porous material to be prepared in a more simple and effective way than that of the prior method, i.e., a method of covalently binding chiral modifiers to the zeolite surface.

Therefore, it is an object of the present invention to provide a chiral inorganic-organic composite porous material, a preparation method thereof, and a method of using said composite porous material as a chiral-selective catalyst or a material of separating an isomeric mixture.

In one aspect, the present invention provides a chiral inorganic-organic composite porous material in which cationic chiral organic molecules are present as charge-balancing cations in a porous material containing charge-balancing cations, as well as a method of using said composite porous material as a chiral selective catalyst or a material of separating an isomeric mixture.

In another aspect, the present invention provides a method for preparing a chiral inorganic-inorganic composite porous material, the method comprising the step of ion-exchanging charge-balancing cations contained in a porous material with cationic chiral organic molecules.

Hereinafter, the present invention will be described in detail.

As the inorganic support constituting the chiral inorganic-inorganic composite porous material according to the present invention, any porous material containing charge-balancing cations may be used.

The porous material containing charge-balancing cations is a material having a porous structure while requiring cations for charge balance, in which the cations are exchangeable with other cations. In this specification, these cations are referred to as "charge-balancing cations". Namely, the inorganic support used in the chiral inorganic-organic composite porous material according to the present invention requires the porous structure and the charge-balancing cation exchange property. Thus, materials having the porous structure and the charge-balancing cation exchange property are within the equivalent scope of the present invention regardless of their components.

Examples of porous materials containing charge-balancing cations, which can be used in the present invention, include but are not limited to, zeolite, zeolite-like material having charge-balancing cations, ASU ($In_{10}S_{18}$(1,3,4,6,7, 8-hexahydro-2H-pyrimido[1,2-α]pyrimidine)$_6$ ($H_2O$)$_{15}$), $In_{10}S_{18}$ (dipiperidinomethane)$_3$($H_2O$)$_7$), HKUST([$Cu_3$(benzene-1,3, 5-tricarboxylate)$_2$($H_2O$)$_3$]$_7$), and mixtures thereof.

Zeolite is the generic name for crystalline aluminosilicates and means a crystalline complex oxide where aluminum and silicon atoms are tetrahedrally coordinated. The basic unit of zeolite crystals is $TO_4$ where a silicon or aluminum atom (T) is coordinated to four oxygen atoms, and the crystal structure of zeolite may vary depending on how the basic units bind to each other. In order for zeolite consisting of silicon and aluminum oxides to be electrically neutral, charge-balancing cations corresponding to aluminums are required. This is because an aluminum atom having a charge of +3 is not electrically balanced with the surrounding four oxygen atoms. Accordingly, in order for zeolite to be neutral, additional cations are required, and these cations are called "charge-balancing cations" and can be exchanged with other cations.

Preferred examples of zeolites which can be used in the present invention include A-zeolite, Y-zeolite, X-zeolite, and L-zeolite. Y-zeolite is most preferably used. This is because Y-zeolite has a structurally stable framework even in chemical treatments, such as ion exchange at high temperature or for a long period, dehydration, adsorption, and acidic conditions with high $H^+$ concentration, and is inexpensive.

The zeolite-like material means a material where the T atom in the basic unit of zeolite has been substituted with an atom other than silicon or aluminum, for example, Ga, P, Ge, Fe, Zr, Ti, Cr, B, Be, V, Zn, or As. This zeolite-like material is a porous crystal which is different in constituent elements from zeolite but has the same orientation as that of zeolite. Thus, this material shows a reversible adsorption-desorption process and a molecular sieve effect, similar to zeolite. Also, charge-balancing cations may be required depending on the substituent atom, and these cations can be exchanged with other cations.

As organic materials constituting the chiral inorganic-organic composite porous material according to the present invention, organic molecules allowing charge-balancing cations contained in the organic support (porous material) to be exchanged with cationic chiral organic molecules may be used. Namely, any organic molecules with chiral and cationic properties may be used without limitations. The organic molecules with cationic properties also include molecules with both cationic and anionic properties. Particularly, as the cationic chiral organic molecules, amino acids are preferably used.

The reason is that the amino acids are the structural units of proteins or peptides which catalyze chemical reactions in industrial processes or physiological procedures. Another reason is that the amino acids are zwitterionic substances that are environmentally harmless and have acidic functional groups (—$NH_3^+$) and basic functional groups (—$CO_2^-$). In the present invention, amino acids with chiral properties (i.e., chiral amino acids) may be used without limitations. In this way, the cavities and tunnels of the porous material containing charge-balancing cations can be introduced with a variety of amino acid side-chain functional groups, such as hydroxyl groups (serine and threonine), carboxyl groups (glutamic acids), sulfonyl groups (cystein and methionine), amino groups (asparagines and glutamine), cyclic groups (histidine and tryptophan), amine groups (lysine and arginine), hydrophobic groups (leucine, proline, valine, alanine and isoleucine) and phenyl groups (phenylalanine).

In the present invention, the chiral inorganic-organic composite porous material can be prepared by ion exchanging the charge-balancing cations of the charge-balancing cation-containing porous material with the cationic chiral organic molecules.

Any ion exchange method known in the art may be used in the present invention without specific limitations. For example, the ion exchange may be carried out by bring the cation exchange material (porous material) into contact with an excess amount of a cationic solution, and preferably a two times larger amount of a cationic solution than the amount required for complete ion exchange, at room temperature. This contact process may also be repeated. Particularly in the case of amino acids, this process may be carried out at a temperature of 15-100° C., and preferably about 80° C. A temperature of less than 15° C. will lead to a reduction in cation exchange efficiency, and a temperature of more than 100° C. will result in the breakdown of zeolites, amino acids, etc.

The chiral organic molecules introduced into the non-chiral cavities and tunnels of the charge-balancing cation-containing porous material by the above-described ion exchange process impart chiral properties to the negatively charged porous material by a strong electrical attraction with the framework structure of the porous material. Accordingly, in the inorganic-organic composite porous material prepared according to the present invention, the chiral properties of the organic molecules can harmonize with the physical properties (i.e., thermal stability, durability, etc.) of the porous material, such as zeolite or zeolite-like material having charge-balancing cations. Moreover, the chiral organic molecules have very improved stability since they are present as members of the framework structure of the porous material by the ion exchange process, unlike the prior art. The above method of imparting chiral properties to the non-chiral porous material by the ion exchange process is a highly useful method capable of substituting for the prior method of covalently binding chiral substances.

However, when zwitterionic substances such as amino acids are introduced directly into the charge-balancing cations of the porous material by the above-described ion exchange process, the efficiency will be slightly low. To solve this problem, one embodiment of the present invention is characterized by using a method comprising the steps of: a) ion-exchanging the charge-balancing charges of the charge-balancing charge-containing porous material with transition metal cations; and b) ion-exchanging the transition metal cations introduced into the porous material in the step a) with chiral amino acids, for example, L-amino acids or D-amino acids. The application of the amino acids will now be described in detail.

Amino acids will be stable if they are present in a zwitterionic form, a neutral form. If such amino acids are ion-exchanged with the charge-balancing cations of the porous material, the neutral amino acids will be simply adsorbed and the efficiency will be low. For these reasons, in the present invention, the charge-balancing cations of the porous material are ion-exchanged with transition metal cations before ion exchange with the amino acids, thus reducing the pH of the porous material containing charge-balancing cations. The reasons are that the transition metal cations have the ability to hydrolyze water, and this ability is greatly increased by the solid electrolyte properties of the porous material, such as zeolite. Thus, the transition metal cations produce OH and $H^+$ by hydrolysis within the porous material such as zeolite, and a reduction in pH caused by the produced $H^+$ allows the negatively charged carboxyl groups of the amino acids to be neutral by taking protons and allows the positively charged amino groups to be maintained in the form of positive charges. This can prevent the neutral amino acids from being simply adsorbed, and help the amino acids to be ion-exchanged with the charge-balancing cations.

Transition metal cations which can be used in the present invention include $Mn^{2+}$, $Co^{2+}$, $Ni^{2+}$ and $Cu^{2+}$. Particularly preferred is $Cu^{2+}$. Thus, as compounds providing the transition metal cations, any ionizable salts containing the above-described transition metal ions may be used, Particularly preferred are, for example, transition metal-containing chlorides, nitrides, and sulfates.

The degree of ion exchange of the amino acids with the porous material containing charge-balancing cations depends on the chemical properties of the transition metal cations, the hydrolysis degree of the transition metal cations according to ion exchange temperature, and the acidity within the porous material. For example, excessively low ion exchange temperature reduces ion mobility, and excessively high temperature deteriorates the structural stability of materials. For this reason, it is preferred to control the ion exchange temperature to a suitable level in order to control the internal acidity of the porous material.

Furthermore, the physical and chemical properties of the porous material, such as the volume, surface area, spatial charge distribution and hydrophilicity, and particularly chiral properties by amino acids, vary depending on the properties of the chiral amino acids introduced into the charge-balancing cations, for example, the size, polarity, hydrophobicity or hydrophilicity of the amino acids.

Accordingly, the degree of ion exchange of the chiral organic molecules can be adjusted depending on the end purpose by the kind of transition metal cations, the kind of amino acids, ion exchange temperature, etc., and thus, the chiral inorganic-organic composite porous material according to the present invention has particular applicability. The asymmetrical environment of the cavities and tunnels of the porous material, which is caused by the amino acids, allows the inventive material to function either to separate an optical isomeric mixture or as a catalyst or a chiral sensor.

The ion exchange of the amino acids in the inventive method can be ascertained from the results of inductively coupled plasma (ICP) spectrometry, IR spectrum analysis, powder X-ray diffraction patterns, etc.

The chiral inorganic-organic composite porous material prepared according to the present invention may be used as a chiral-selective catalyst, in order to prepare any one chiral material of D-form and L-form.

Furthermore, the chiral inorganic-organic composite porous material according to the present invention may be used as a material of separating an isomeric mixture. For example, when an isomeric mixture to be separated flows down through a HPLC column filled with the chiral inorganic-organic composite porous material of the present invention, materials with different chiral properties will flow out at different points of time, since the chiral inorganic-organic composite porous material will act on the isomeric mixture selectively depending on chiral properties. By this method, materials can be separated depending on chiral properties. As the method of using the chiral inorganic-organic composite porous material of the present invention as a charal-selective catalyst or a material of separating an isomeric mixture, any method known in the art may be used without specific limitations.

The chiral inorganic-organic composite porous material of the present invention and the method of using the same can contribute to finding a more efficient, fast and accurate method for providing suitable chiral libraries, so that medical drugs having more improved physiological activity and selectivity can be developed. Also, the present invention can be used in various fields, including insecticides, herbicides, aromatics, spice compounds, dyes, pigments, polymers, liquid crystals, and nonlinear optical materials.

BEST MODE FOR CARRYING OUT THE INVENTION

Hereinafter, preferred examples are given for a better understanding of the present invention. It is to be understood, however, that these examples are presented for illustrative purpose only, but are not construed to limit the scope of the present invention.

EXAMPLES 1-18

Example 1

Preparation of Chiral Inorganic-organic Composite Porous Material 1-1: Ion Exchange of Na—Y Zeolite with $Cu^{2+}$ 10 g of purified powder of hydrated Na—Y zeolite having the composition formula $Na_{55}Si_{137}Al_{55}O_{384}$ was mixed with $CuCl_2$ solution (Aldrich, Certified ACS grade) (i.e., a two times large amount of Cu(11) than the amount required for complete ion exchange) at 25° C. The mixture (pH 6.13, 25° C.) was occasionally stirred, and replaced with fresh solution two. times a day. These steps were performed for 5 days, and then, the resulting suspension was filtered through an absorption tube. The resulting filter cake was washed with deionized water to remove the remaining CuCl, ions, followed by drying at 25° C. After the ion exchange, the powder turned from colorless to blue. The obtained powder was dissolved in 6M HCl and analyzed by inductively coupled plasma (ICP) spectrometry.

The ICP measurement was performed in nitrogen oxide/acetylene flames using an ICPS-1000IV spectrometer. The results of two ICP analyses are shown in Table 1 below. As can be seen in Table 1, $Na^+$ ions per unit lattice were reduced and $Cu^{2+}$ ions were increased, as compared to before the ion exchange. This suggests that $Na^+$ ions, charge-balancing cations of zeolite, were ion-exchanged with $Cu^{2+}$ ions.

1-2: Ion Exchange of $Cu^{2+}$ ion-exchanged Y-zeolite with Amino Acid 10 g of the purified powder of Cu-Y zeolite obtained as described above was mixed with 1.25-fold excess amount of L-serine aqueous solution (Sigma-Aldrich, Certified ACS grade) at 80° C. The mixture was continuously stirred at pH 7.6 and 25° C., and replaced with flesh-fresh solution at three-day intervals. After performing the ion exchange for 9 days, the suspension was filtered through an absorption column, and the resulting filter cake was washed with deionized water to remove the remaining amino acid, followed by drying at 25° C. After the ion exchange, the powder turned from blue to brown. This indicates that little or no $Cu^{2+}$ ions remain. And, after the ion exchange, the supernatant turned from colorless to dark pink. This indicates that $Cu^{2+}$ ions are present in the final supernatant.

In order to measure the amount of the remaining $Cu^{2+}$ ions or $Na^+$ ions per unit lattice after the ion exchange, ICP measurement was conducted in the same manner as in Example 1-1, and the results are shown in Table 1 below. The comparison of these results with the results of Example 1-1 showed that little or no $Cu^{2+}$ ions per unit lattice remained. This suggests that the zeolite was ion-exchanged with the amino acid (see Table 1).

The Y-zeolite which has been ion-exchanged with the amino acid was deposited on a KBr plate in a closed cell and subjected to IR spectrometry at a wavelength of 400-4000 $cm^{-1}$, and the results are shown in FIG. 1. The results of the IR analysis were consistent with the spectrum results of L-serine. This suggests that the zeolite was ion-exchanged with the amino acid.

Figure 2:
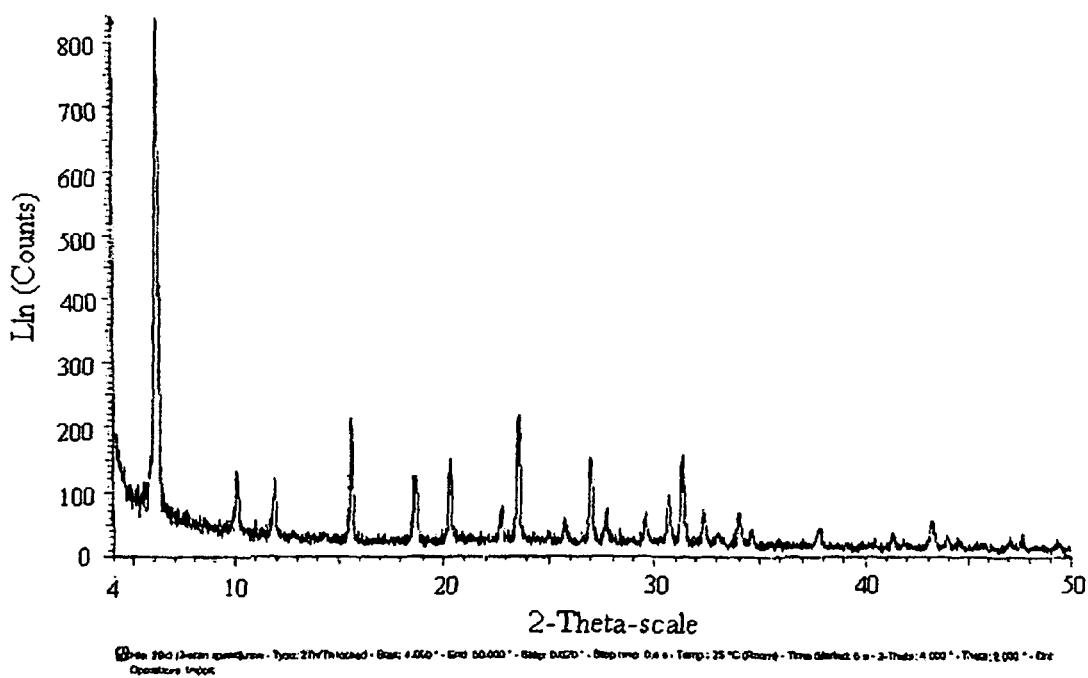
FIGS. 2, 4, 6, 8, 10, 12, 14, 16, 18, 20, 22, 24, 26, 28, 30, 32, 34 and 36 show the results of XRD analysis on chiral inorganic-organic composite porous materials prepared in Examples 1-18, respectively.

X-ray diffraction data for the Y-zeolite which has been ion-exchanged with the amino acid were collected from a diffraction analyzer (Bruker Co, Model D5005) in the following conditions: radiation source: $Cu_{K\alpha1}(\lambda=1.5406$ Å) operated at 40 Kv and 40 mA; scanning speed: 2.4°/min; scanning angle 2θ: 5°-50°; step size: 0.020. The results of measurement of X-ray diffraction patterns are shown in FIG. 2. As can be seen in FIG. 2, the results for the sample which has been ion-exchanged with the amino acid were consistent with those for the sample before ion exchange with the amino acid. This suggests that the zeolite crystallinity was maintained even in the ion exchange process.

Example 2

Figure 3:
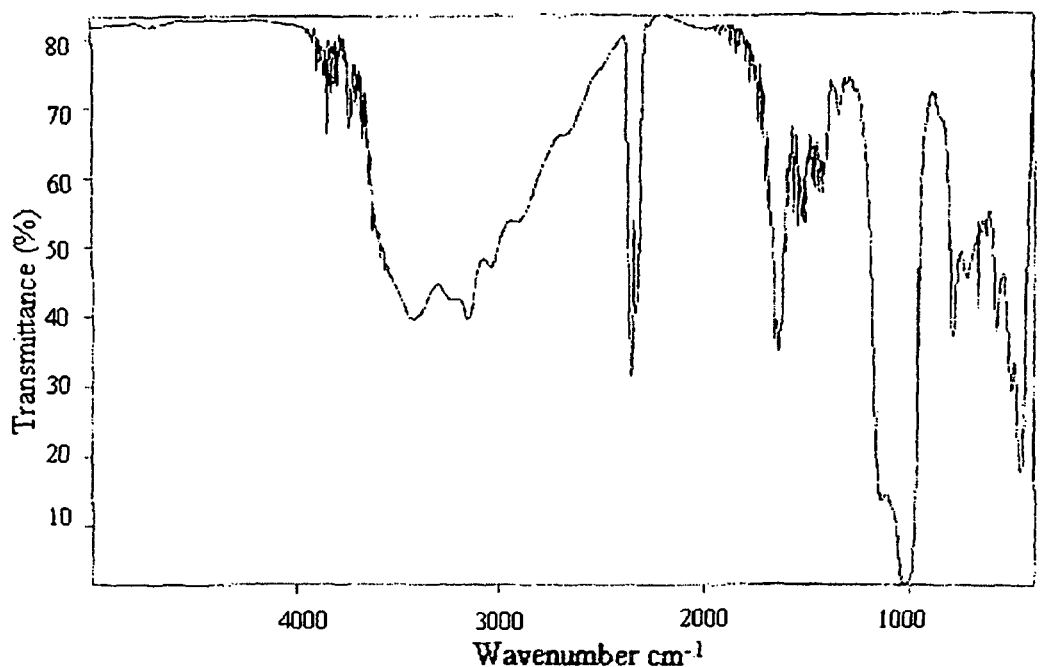
Figure 4:
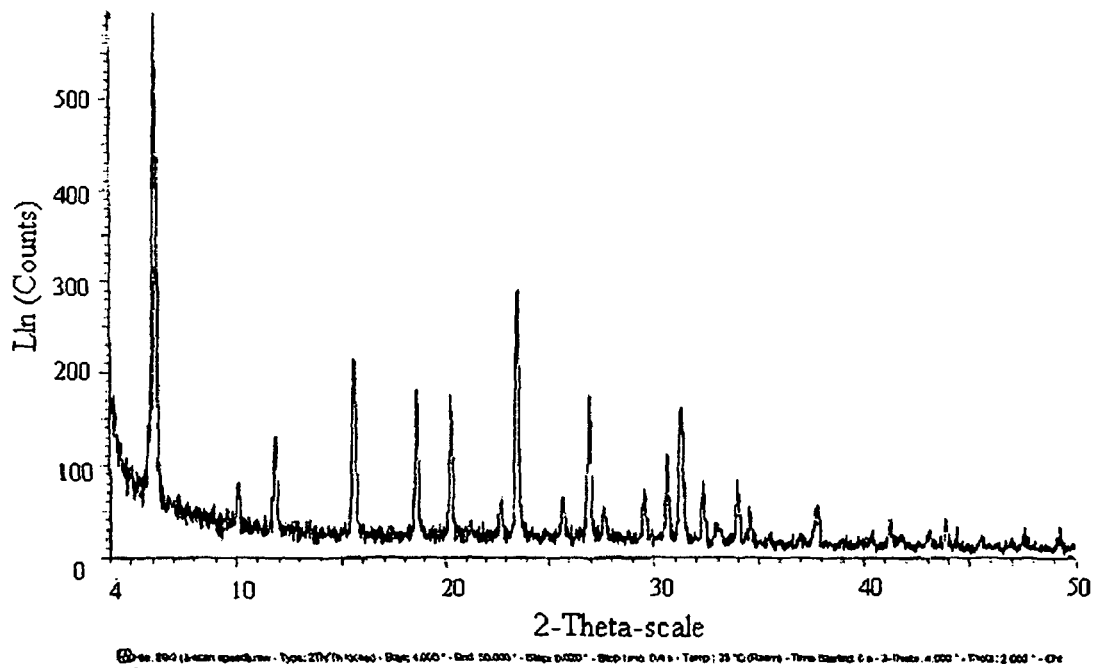

A chiral inorganic-organic composite porous material was prepared by performing ion exchange in the same manner as in Example 1 except that L-histidine in place of L-serine was used. The results of IR and XRD analyses are shown in FIGS. 3 and 4, respectively.

Example 3

Figure 5:
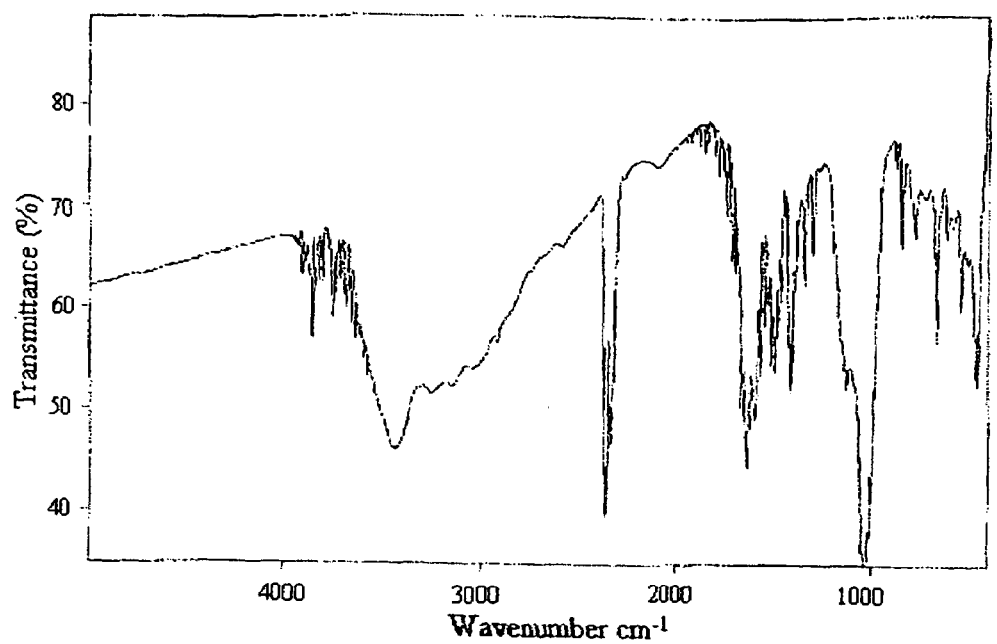
Figure 6:
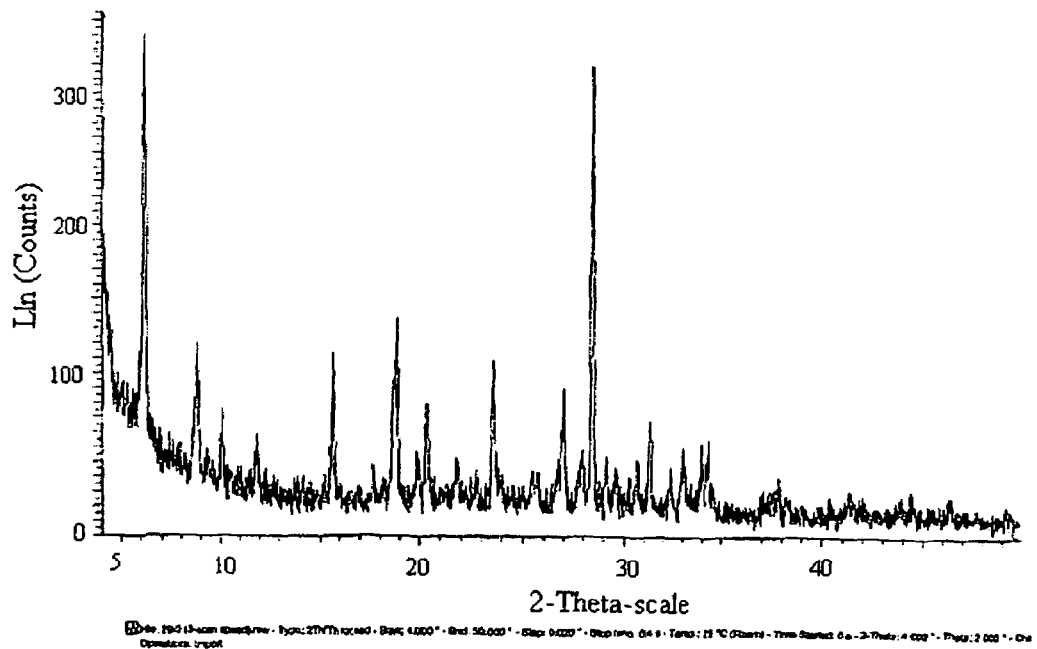

A chiral inorganic-organic composite porous material was prepared by performing ion exchange in the same manner as in Example 1 except that L-cystein in place of L-serine was used. The results of IR and XRD analyses are shown in. FIGS. 5 and 6, respectively.

Example 4

Figure 7:
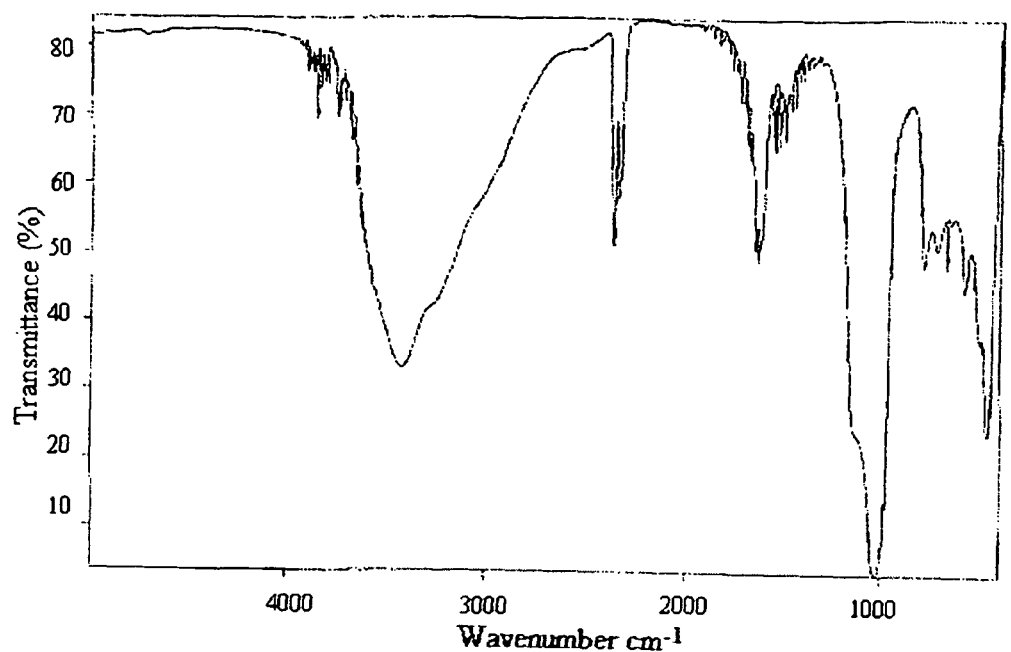
Figure 8:
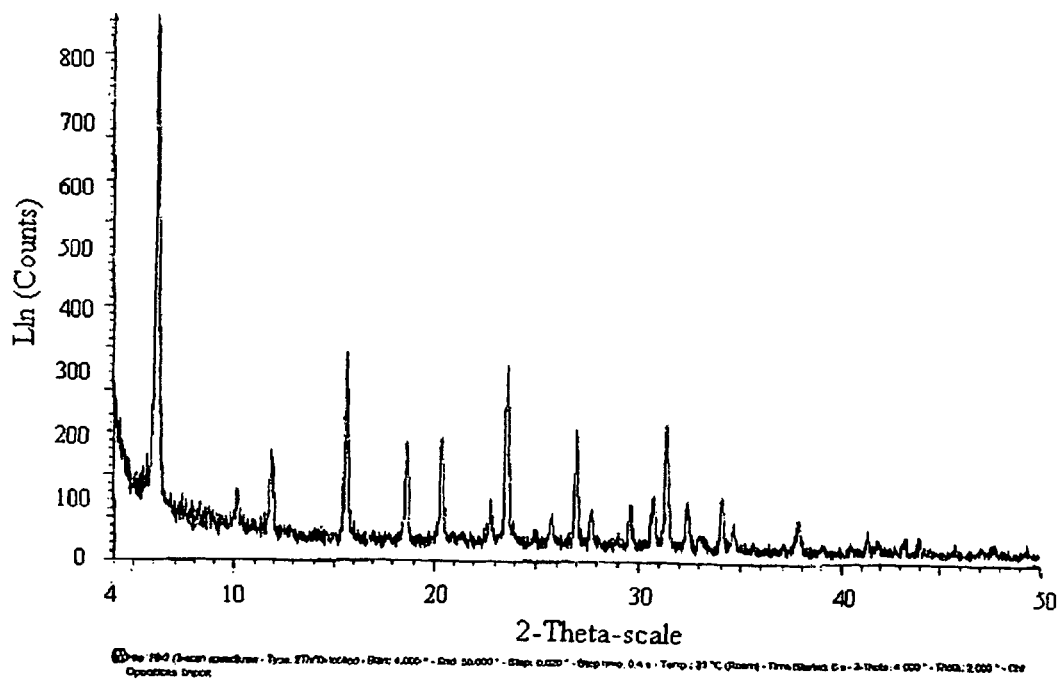

A chiral inorganic-organic composite porous material was prepared by performing ion exchange in the same manner as in Example 1 except that L-alanine in place of L-serine was used. The results of IR and XRD analyses are shown in FIGS. 7 and 8, respectively.

Example 5

Figure 9:
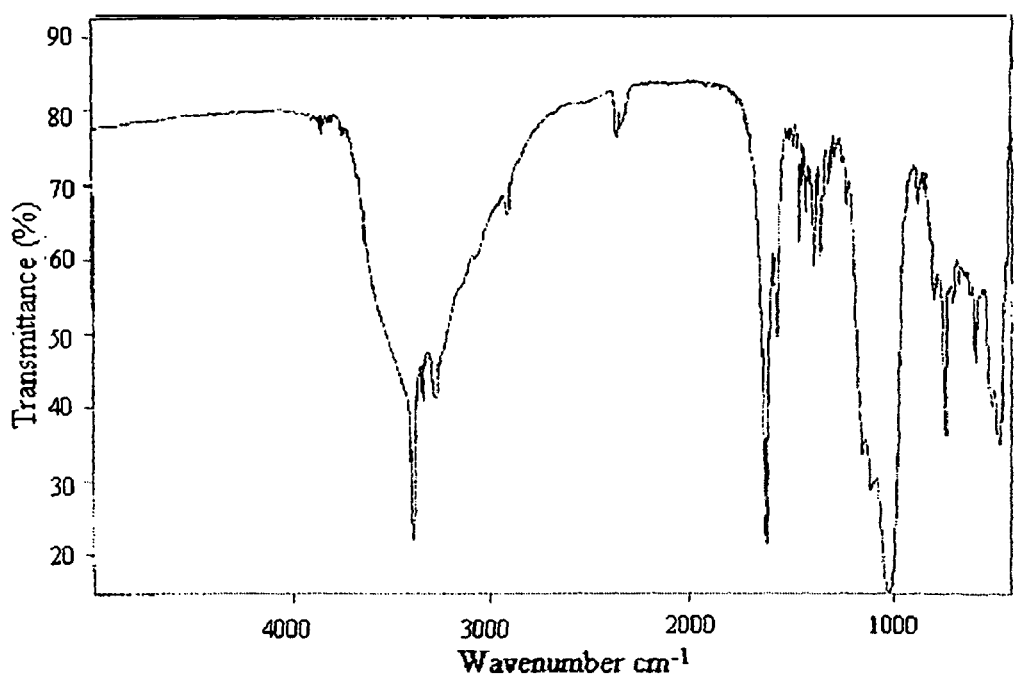
Figure 10:
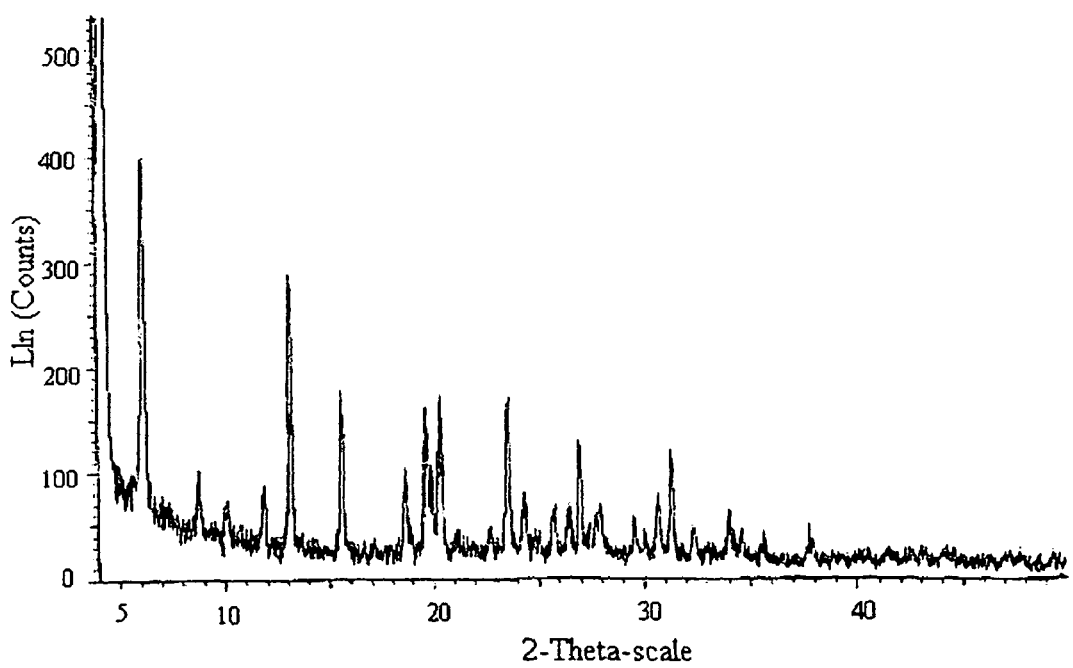

A chiral inorganic-organic composite porous material was prepared by performing ion exchange in the same manner as in Example 1 except that L-tryptophan in place of L-serine was used. The results of IR and XRD analyses are shown in FIGS. 9 and 10, respectively.

Example 6

Figure 11:
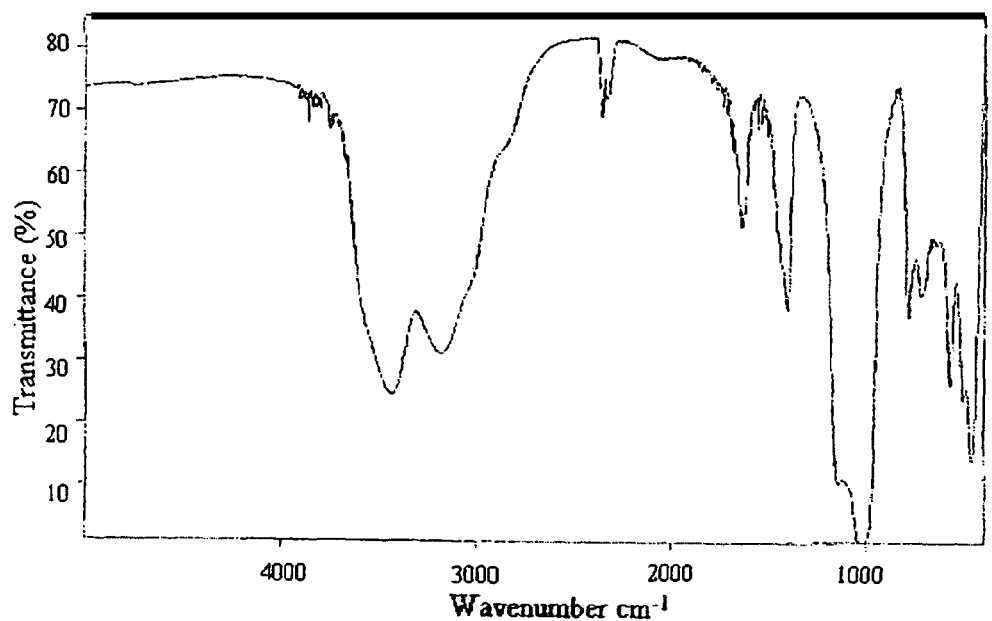
Figure 12:
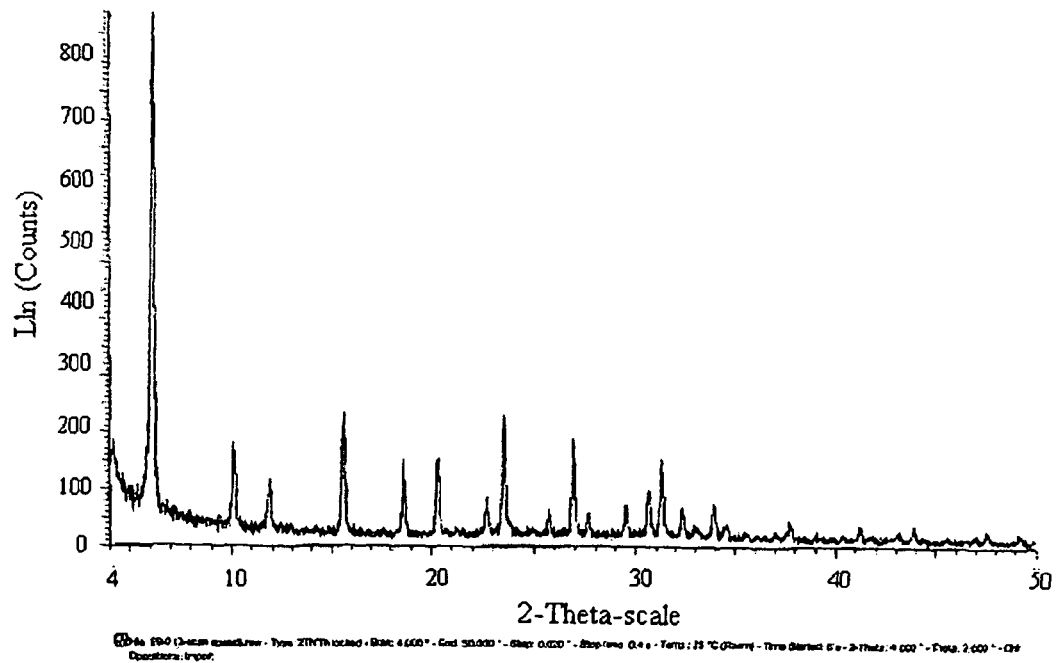

A chiral inorganic-organic porous material was prepared by performing ion exchange in the same manner as in Example 1 except that L-glutamine in place of L-serine was used. The results of IR and XRD analyses are shown in FIGS. 11 and 12, respectively.

Example 7

Figure 13:
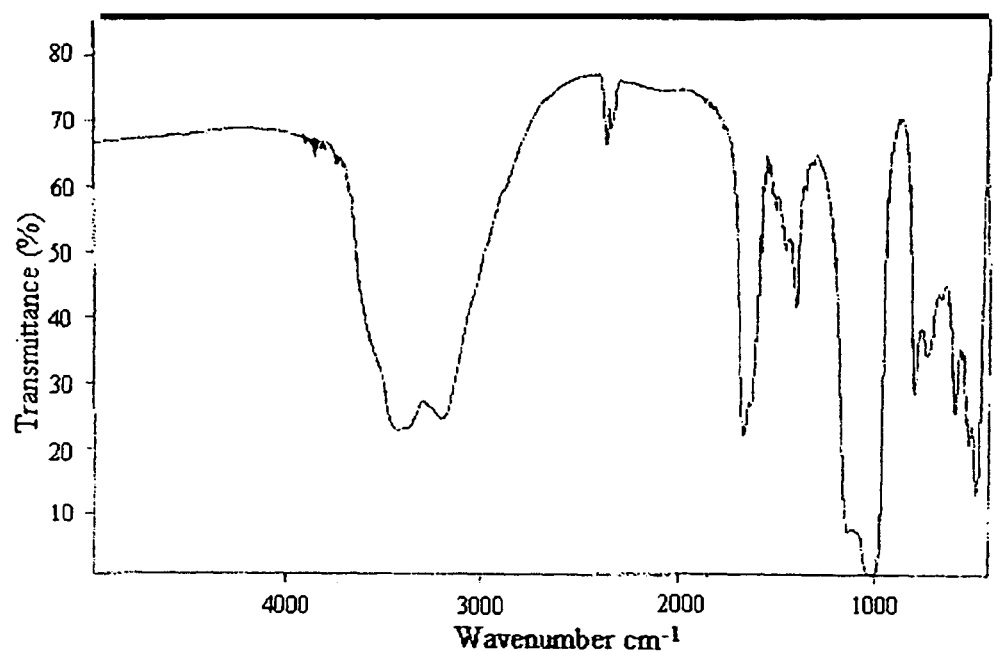
Figure 14:
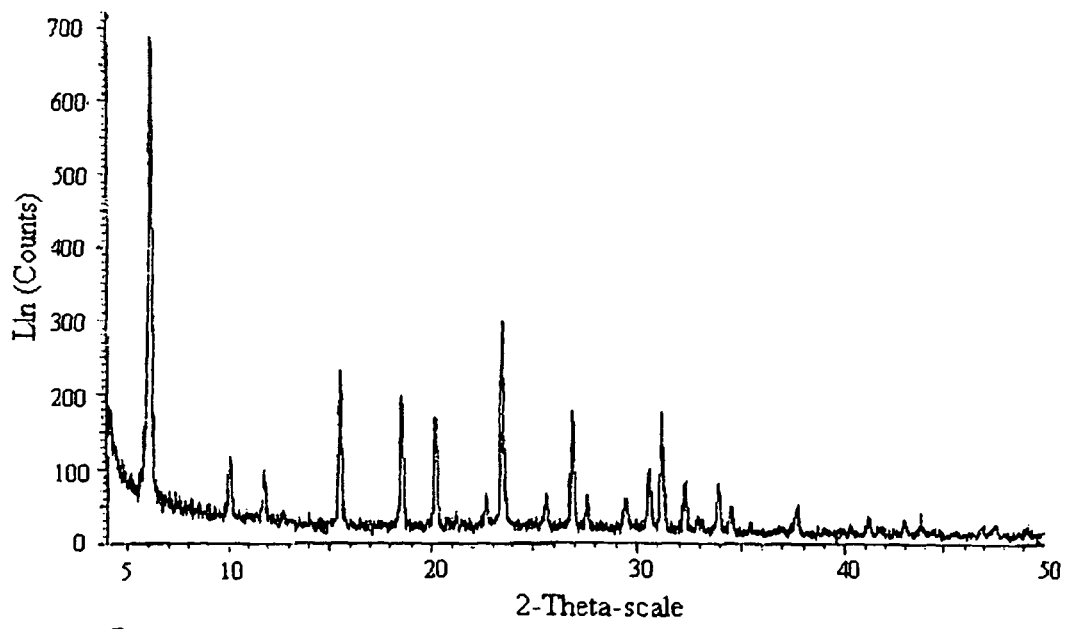

A chiral inorganic-organic composite porous material was prepared by performing ion exchange in the same manner as in Example 1 except that L-arginine in place of L-serine was used. The results of IR and XRD analyses are shown in FIGS. 13 and 14, respectively.

Example 8

Figure 15:
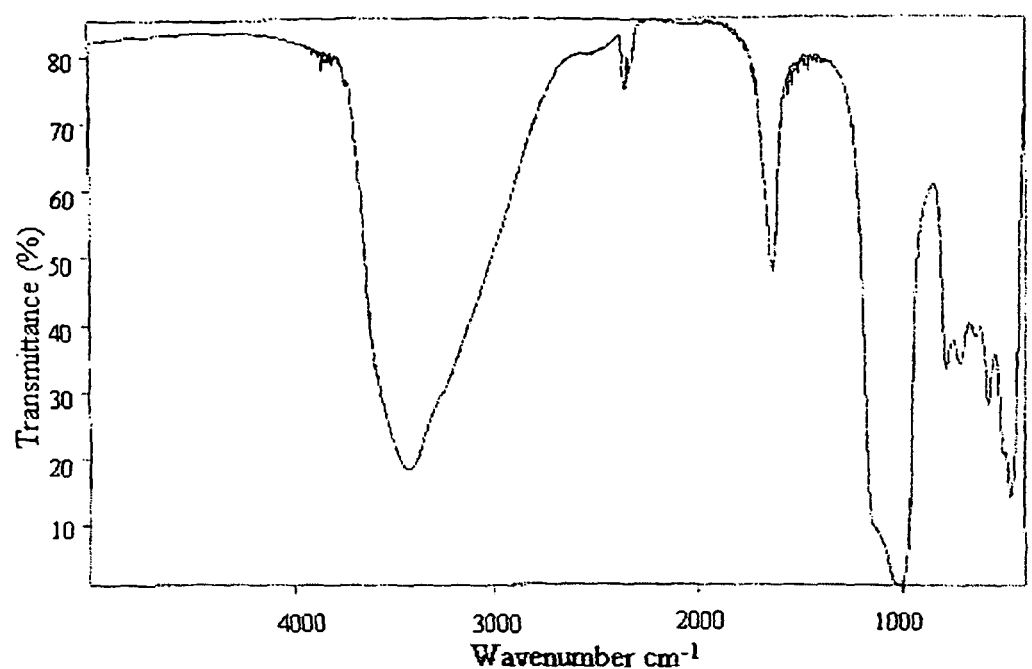
Figure 16:
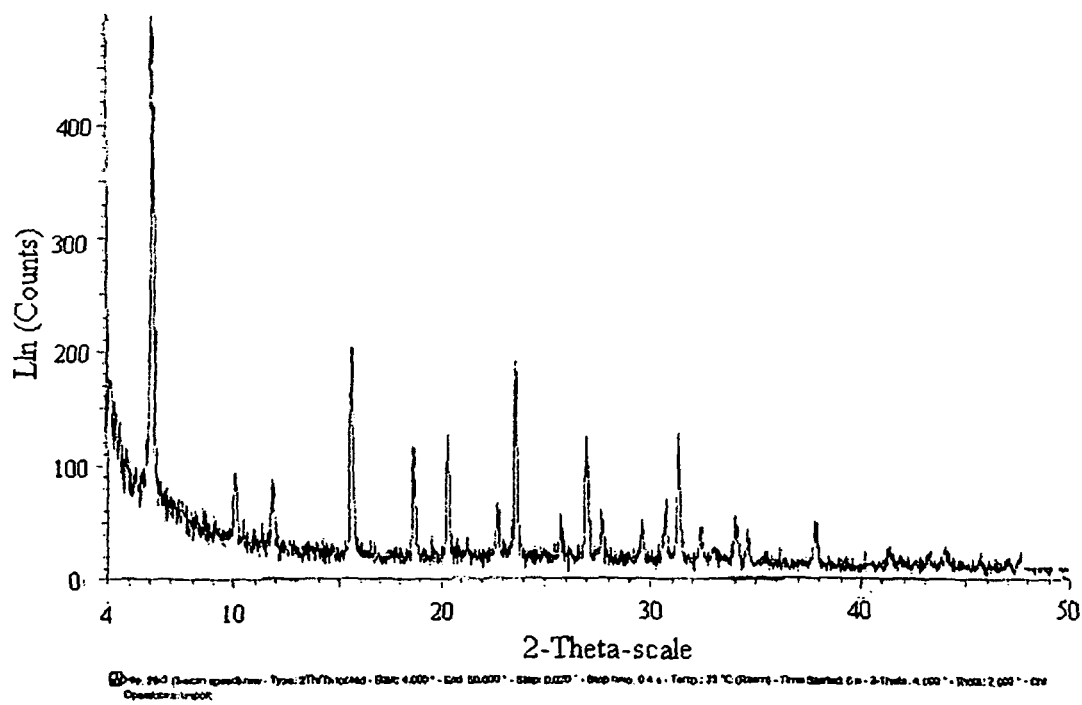

A chiral inorganic-organic composite porous material was prepared by performing ion exchange in the same manner as in Example 1 except that L-methionine in place of L-serine was used. The results of IR and XRD analyses are shown in FIGS. 15 and 16, respectively.

Example 9

Figure 17:
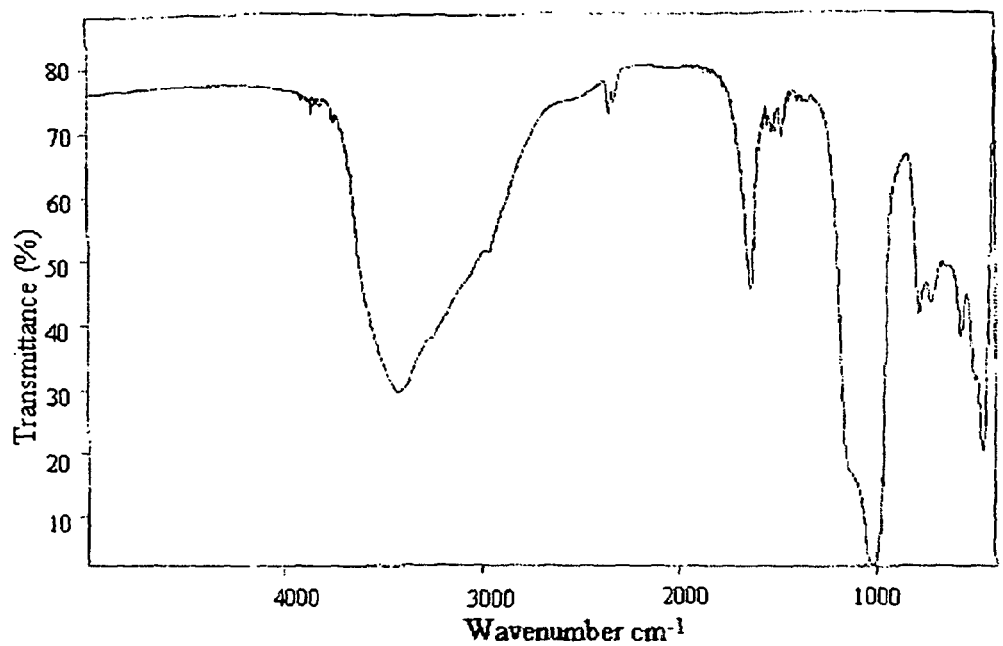
Figure 18:
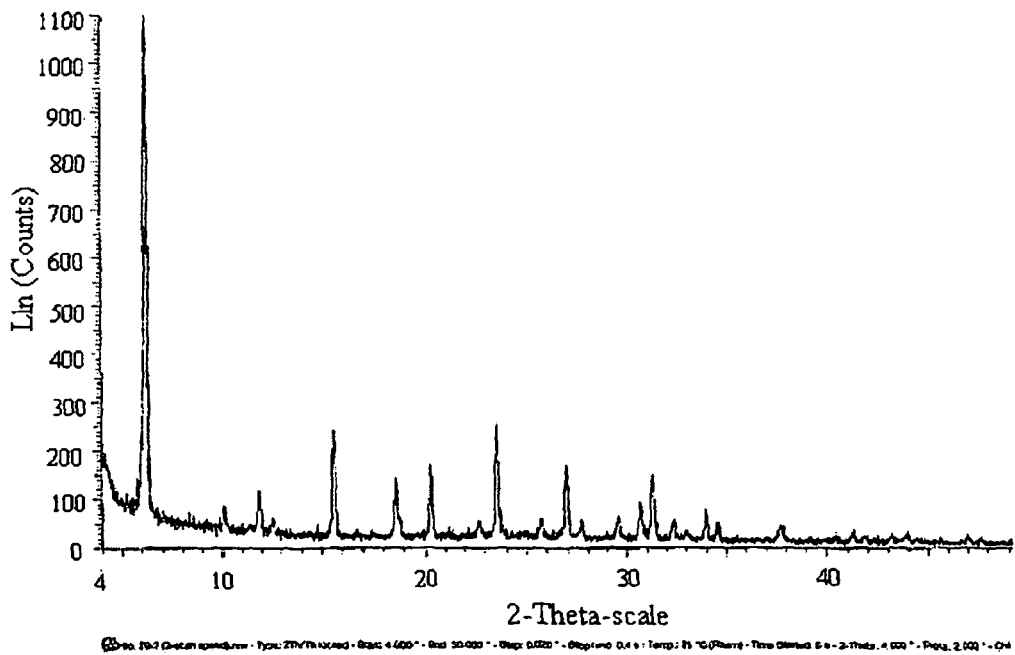

A chiral inorganic-organic composite porous material was prepared by performing ion exchange in the same manner as in Example 1 except that L-leucine in place of L-serine was used. The results of IR and XRD analyses are shown in FIGS. 17 and 18, respectively.

Example 10

Figure 19:
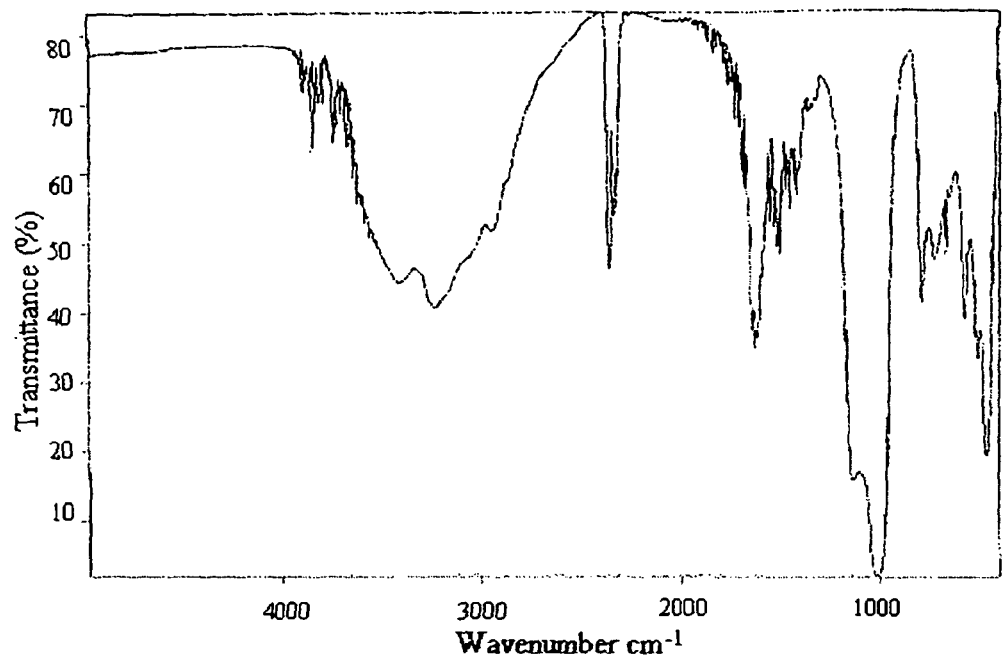
Figure 20:
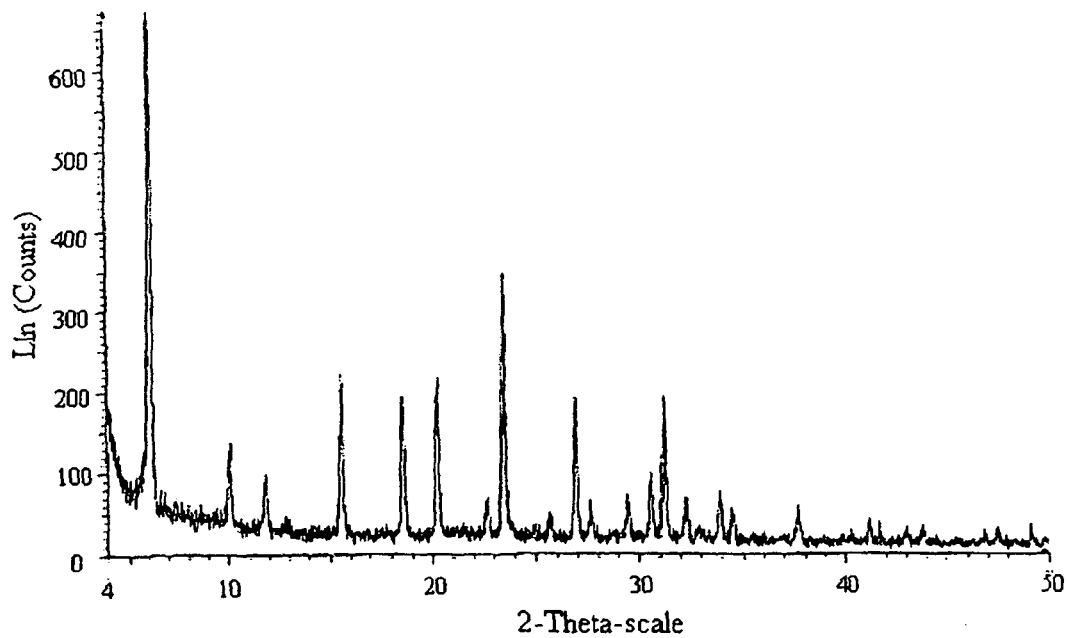

A chiral inorganic-organic composite porous material was prepared by performing ion exchange in the same manner as in Example 1 except that L-lysine in place of L-serine was used. The results of IR and XRD analyses are shown in FIGS. 19 and 20, respectively.

Example 11

Figure 21:
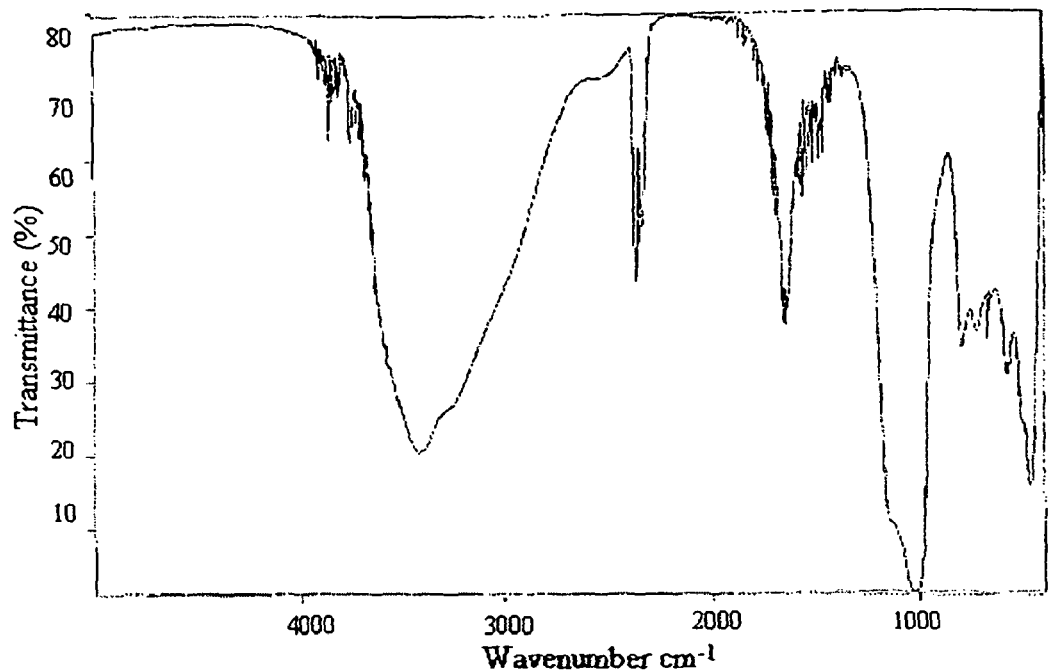
Figure 22:
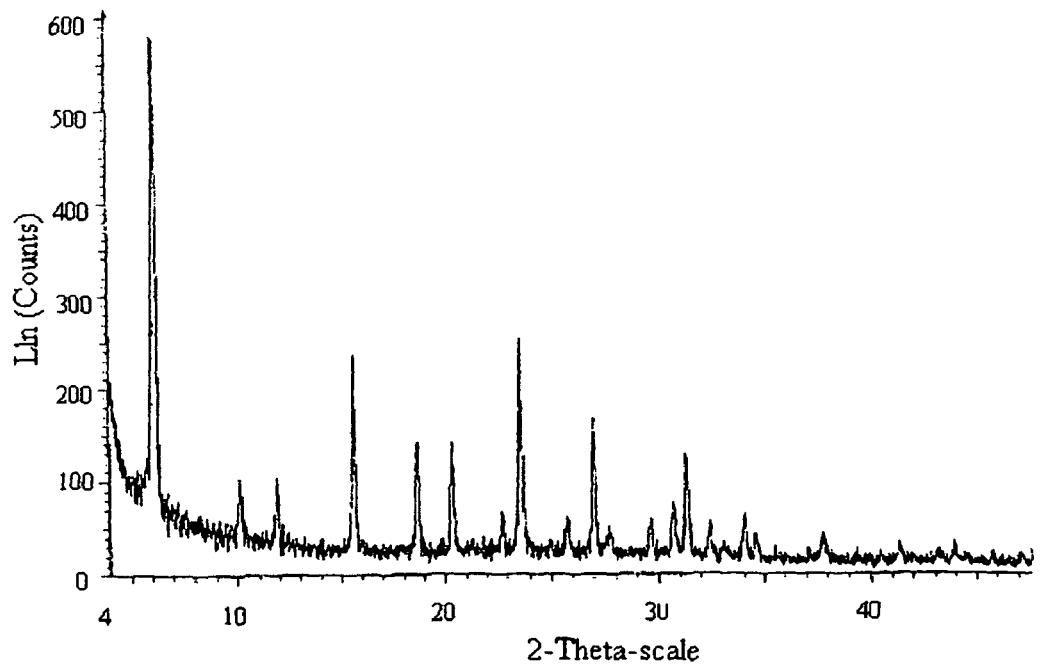

A chiral inorganic-organic composite porous material was prepared by performing ion exchange in the same manner as in Example 1 except that L-glutamic acid in place of L-serine was used. The results of IR and XRD analyses are shown in FIGS. 21 and 22, respectively.

Example 12

Figure 23:
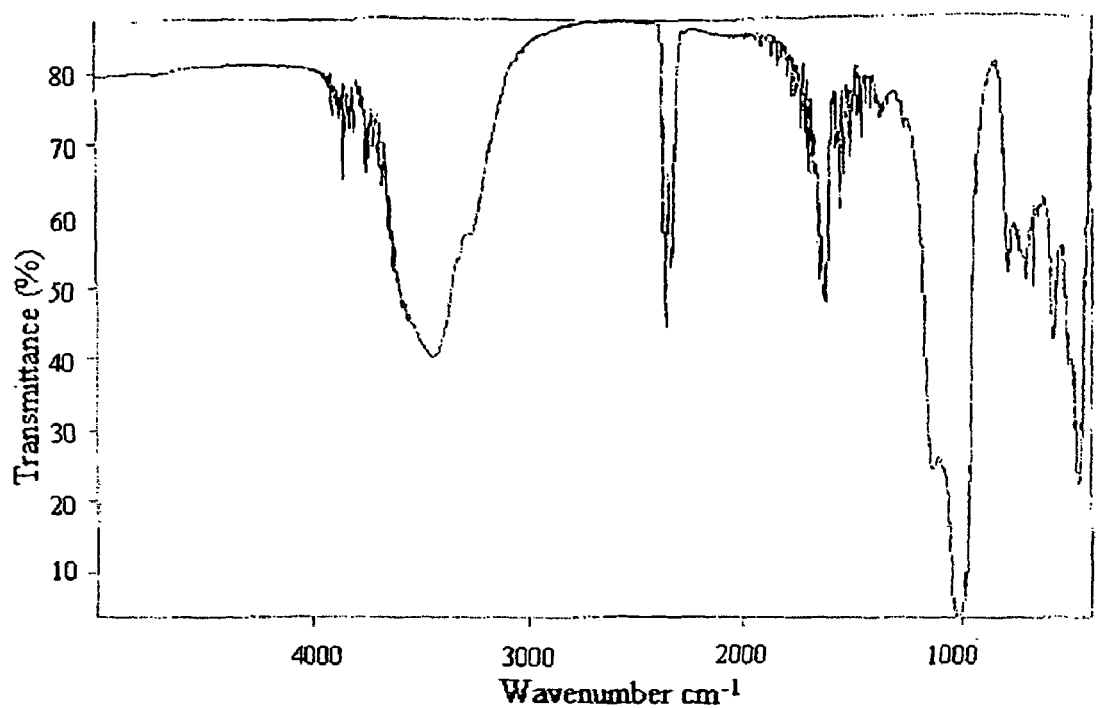
Figure 24:
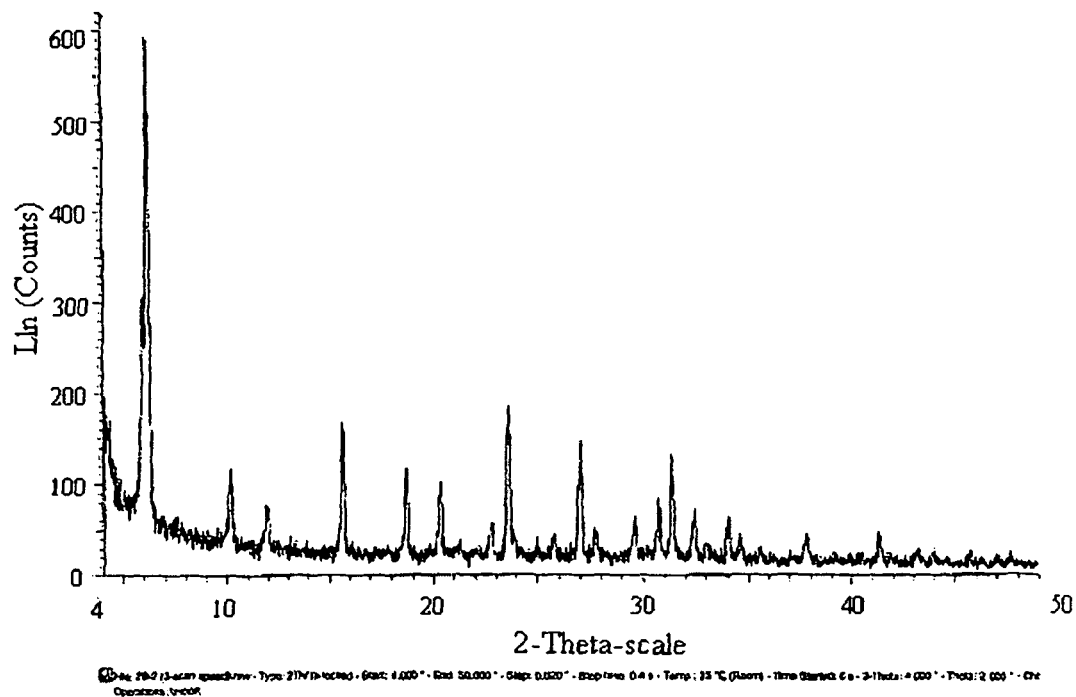

A chiral inorganic-organic composite porous material was prepared by performing ion exchange in the same manner as in Example 1 except that L-phenylglycine in place of L-serine was used. The results of IR and XRD analyses are shown in FIGS. 23 and 24, respectively.

Example 13

Figure 25:
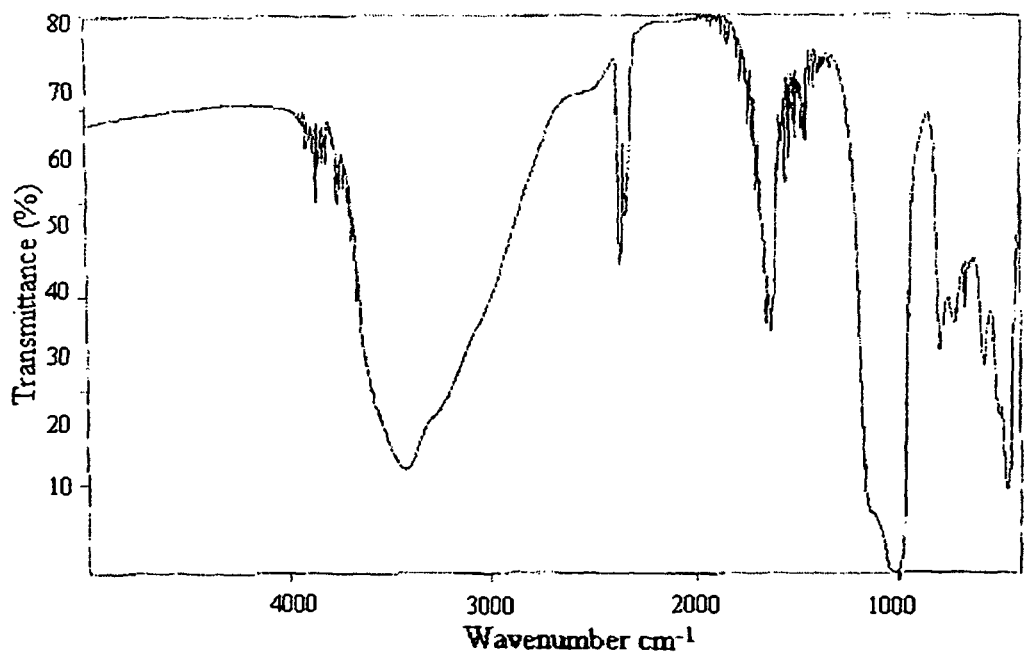
Figure 26:
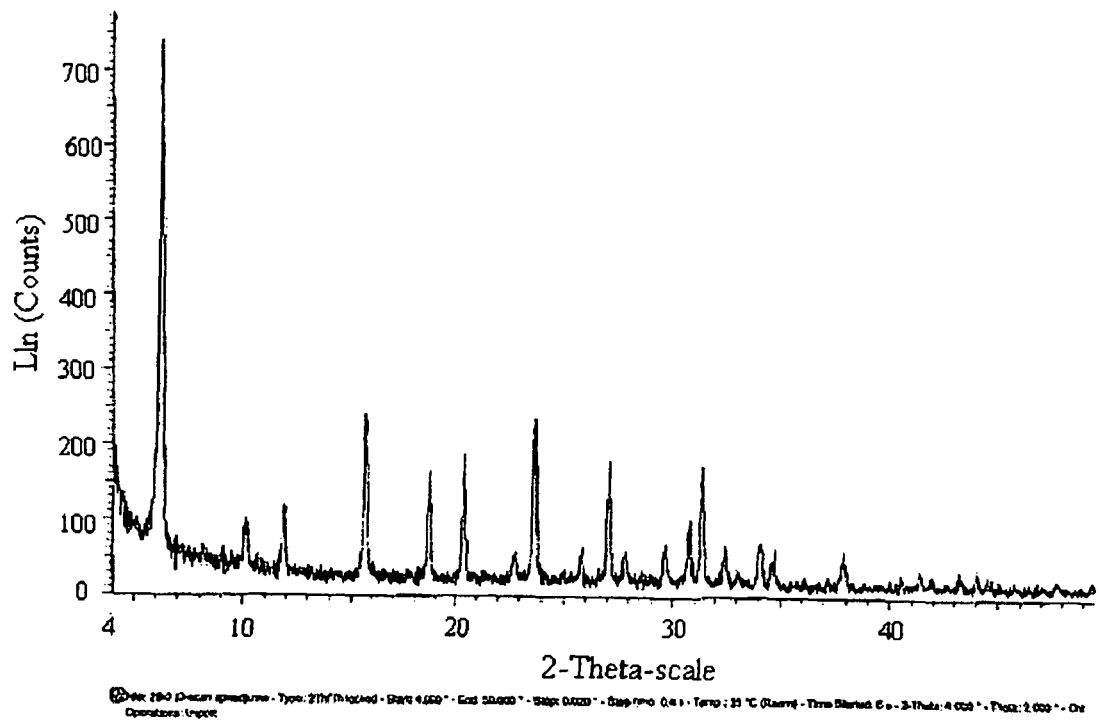

A chiral inorganic-organic composite porous material was prepared by performing ion exchange in the same manner as in Example 1 except that L-proline in place of L-serine was used. The results of IR and XRD analyses are shown in FIGS. 25 and 26, respectively.

Example 14

Figure 27:
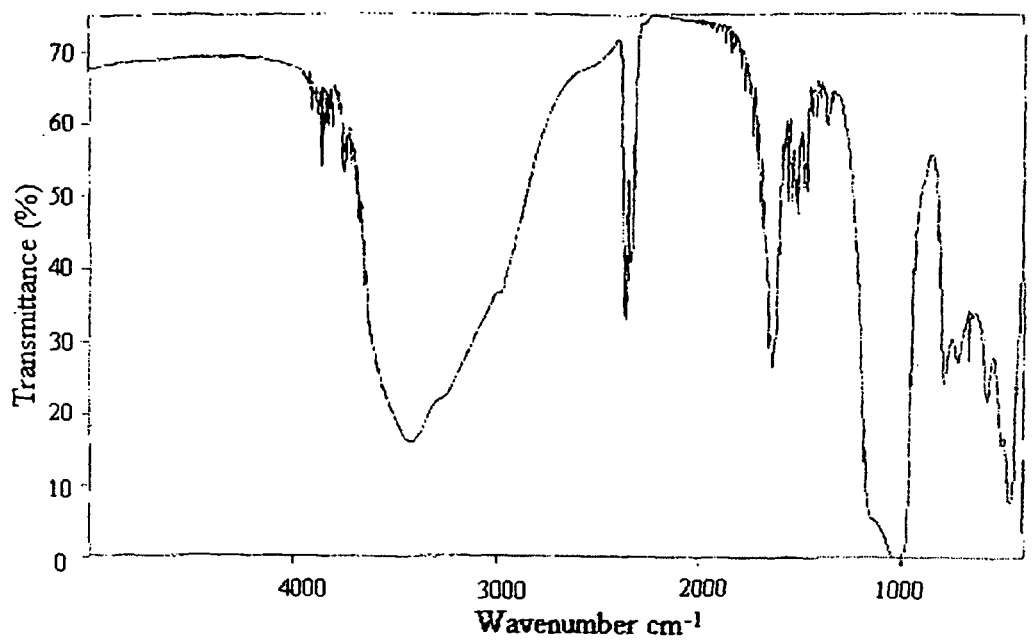
Figure 28:
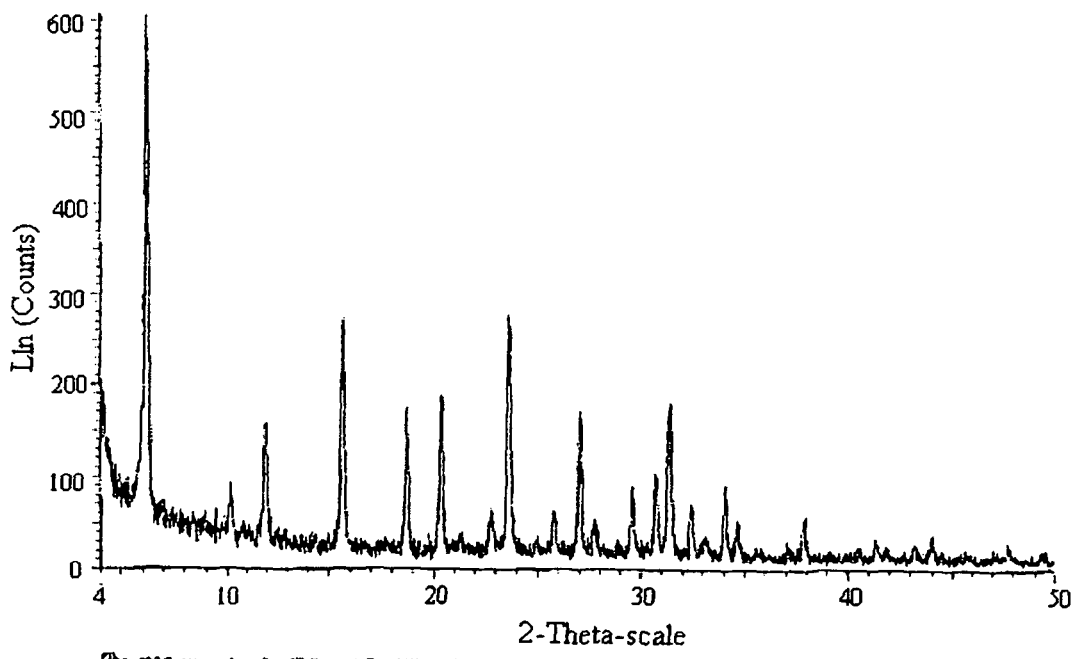

A chiral inorganic-organic composite porous material was prepared by performing ion exchange in the same manner as in Example 1 except that L-valine in place of L-serine was used. The results of IR and XRD analyses are shown in FIGS. 27 and 28, respectively.

Example 15

Figure 29:
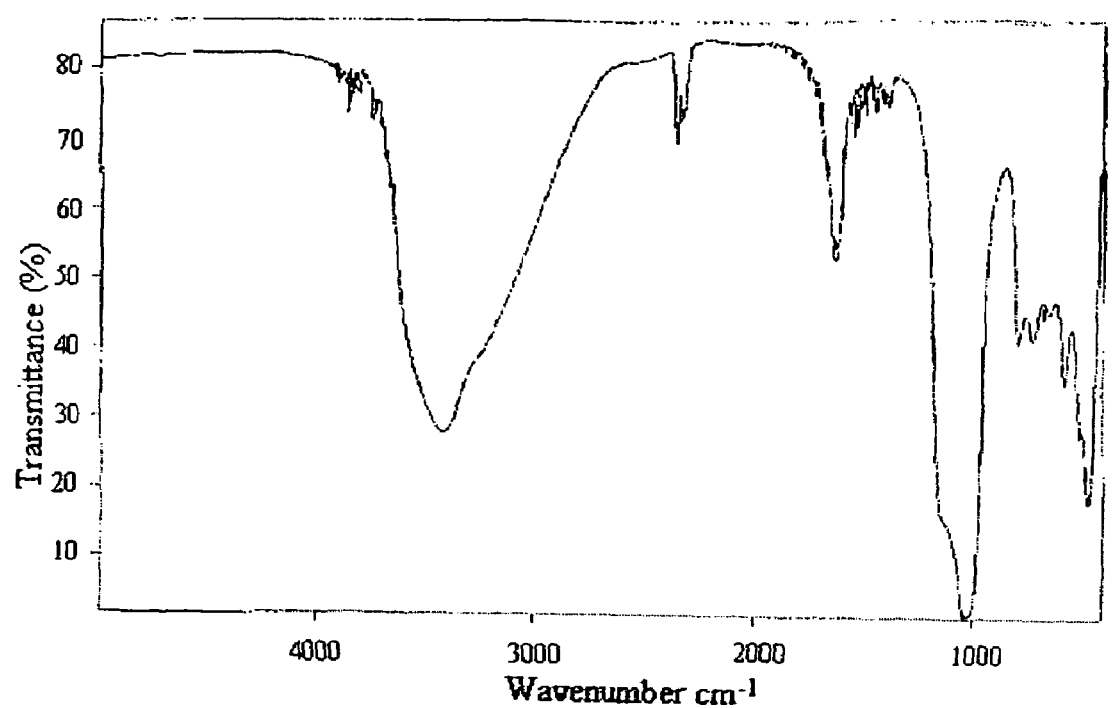
Figure 30:
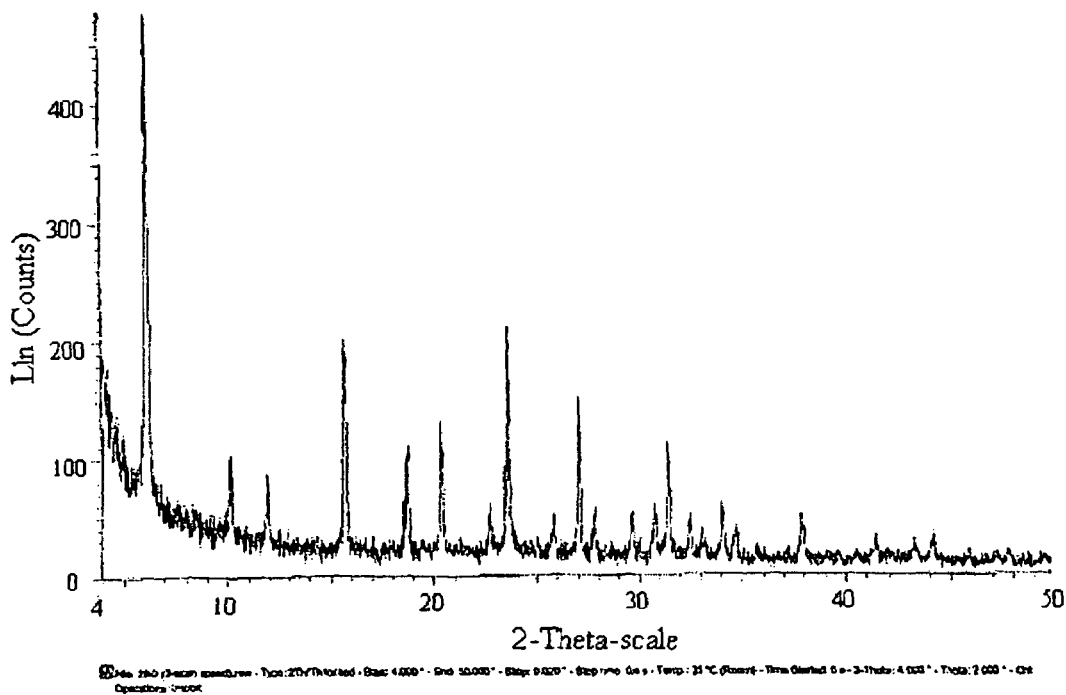

A chiral inorganic-organic composite porous material was prepared by performing ion exchange in the same manner as in Example 1 except that L-valine in place of L-phenylalanine was used. The results of IR and XRD analyses are shown in FIGS. 29 and 30, respectively.

Example 16

Figure 31:
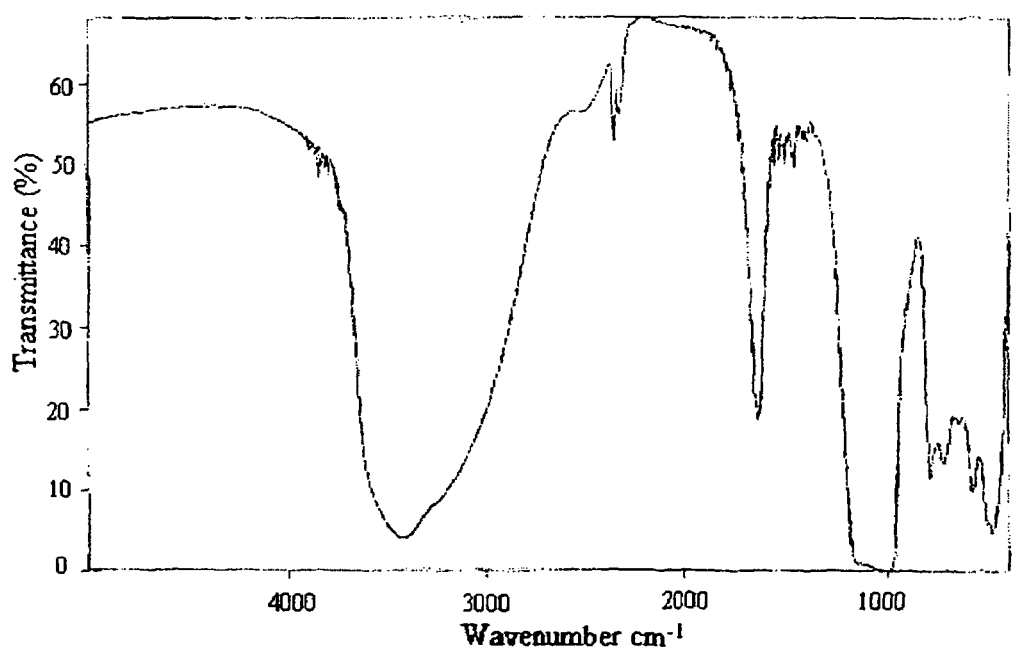
Figure 32:
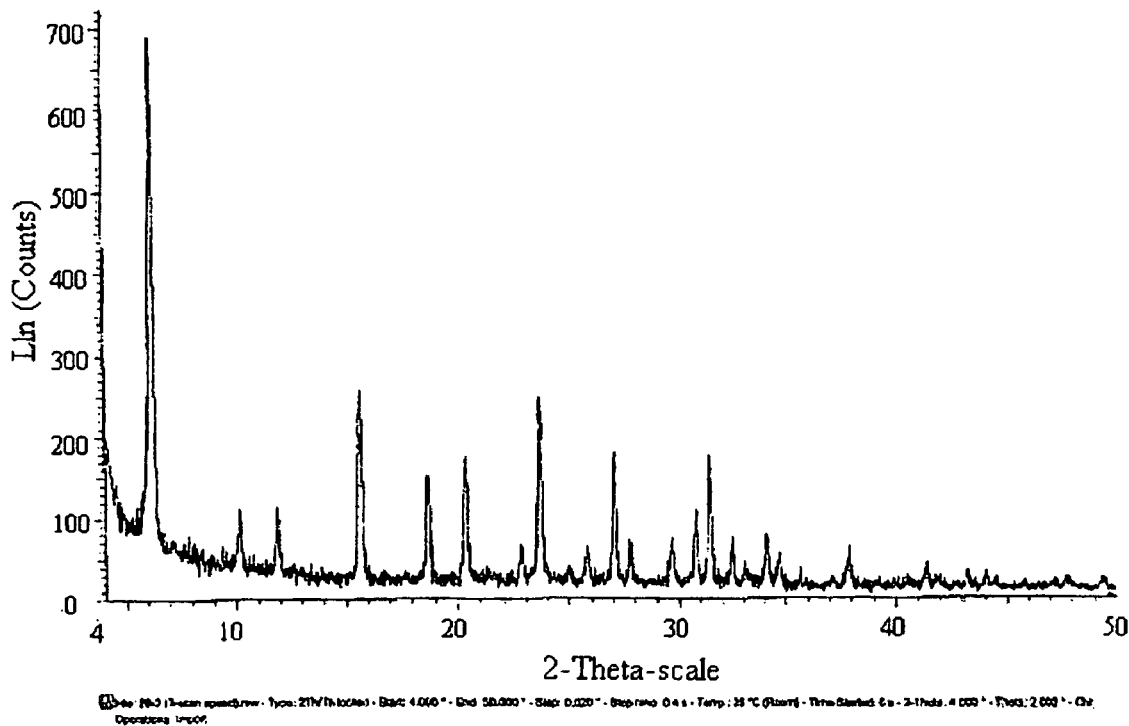

A chiral inorganic-organic composite porous material was prepared by performing ion exchange in the same manner as in Example I except that L-threonine in place of L-serine was used. The results of IR and XRD analyses are shown in FIGS. 31 and 32, respectively.

Example 17

Figure 33:
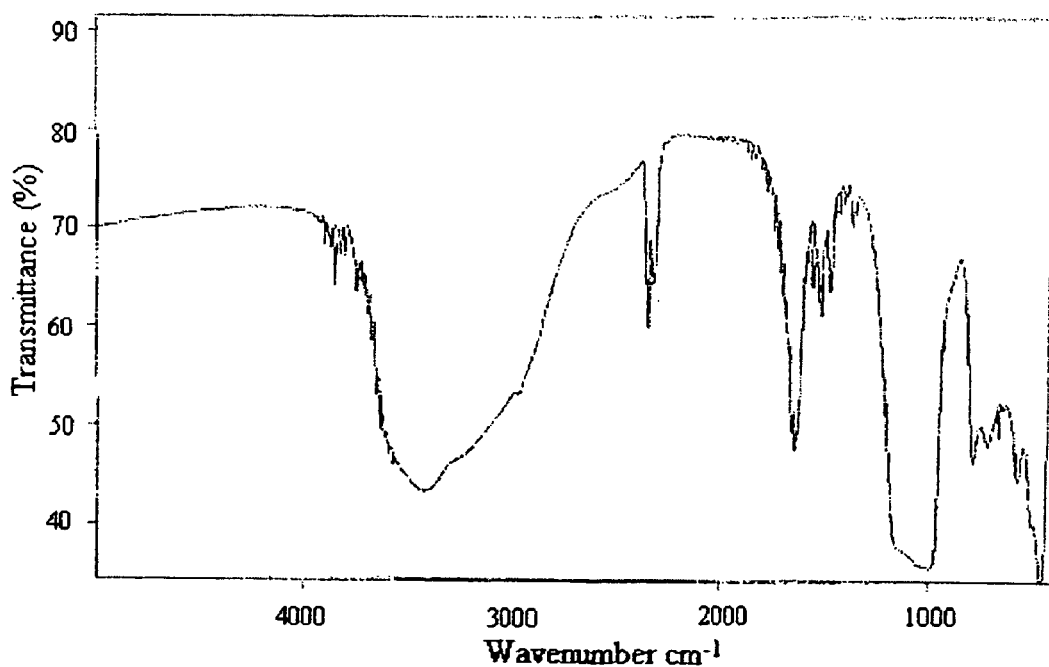
Figure 34:
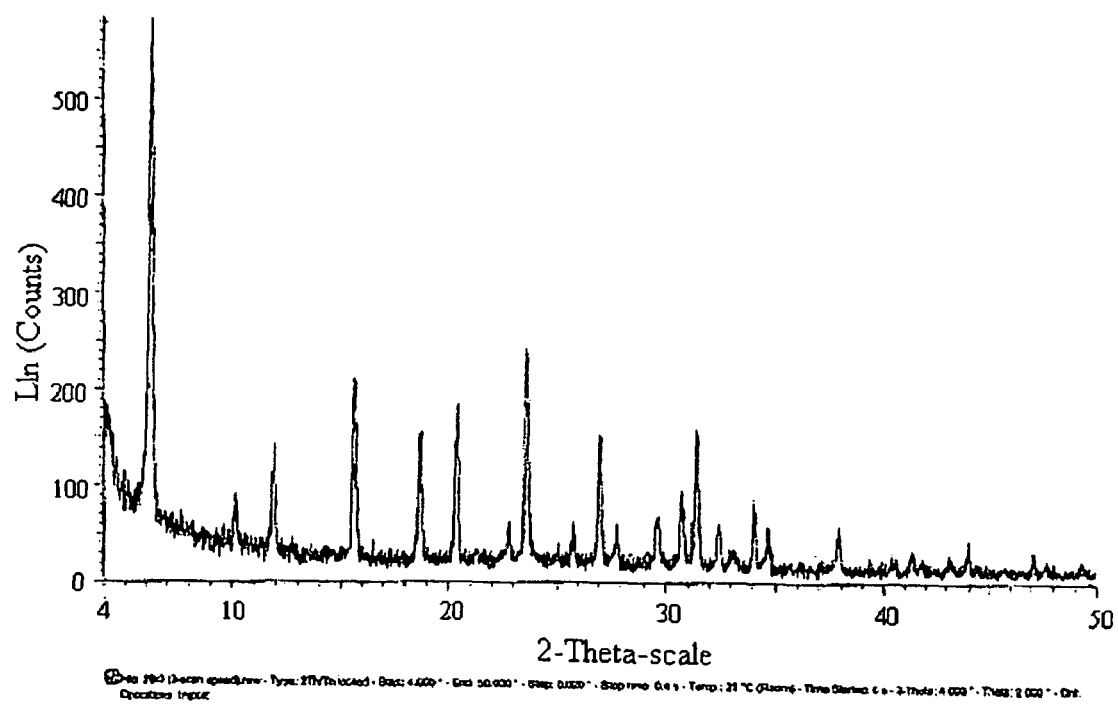

A chiral inorganic-organic composite porous material was prepared by performing ion exchange in the same manner as in Example 1 except that L-isoleucine in place of L-serine was used. The results of IR and XRD analyses are shown in FIGS. 33 and 34, respectively.

Example 18

Figure 35:
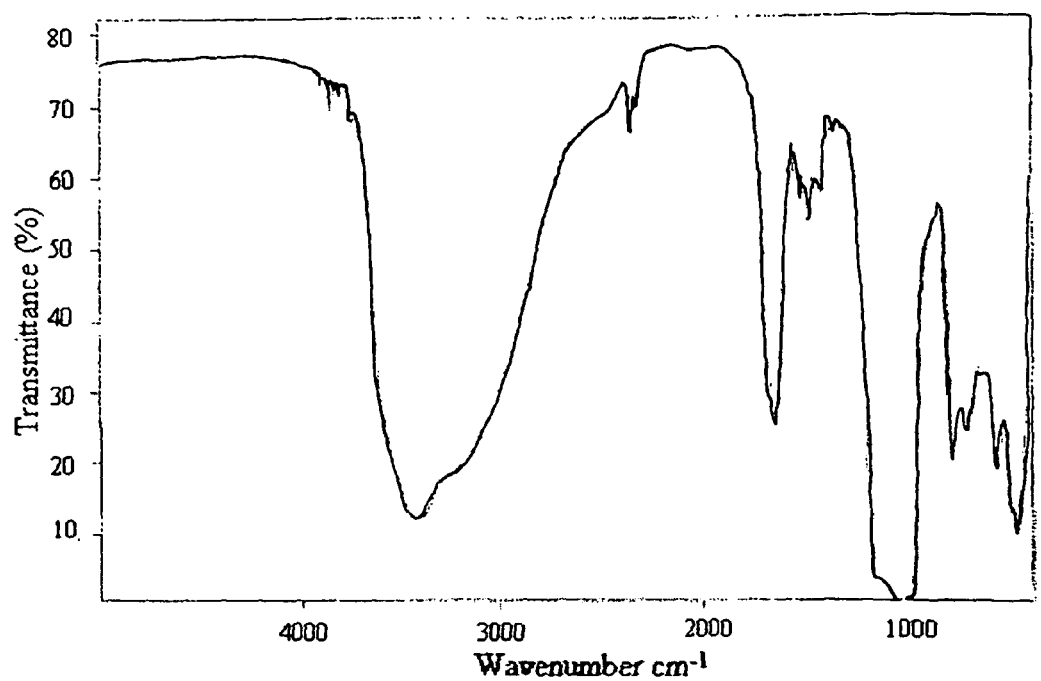
Figure 36:
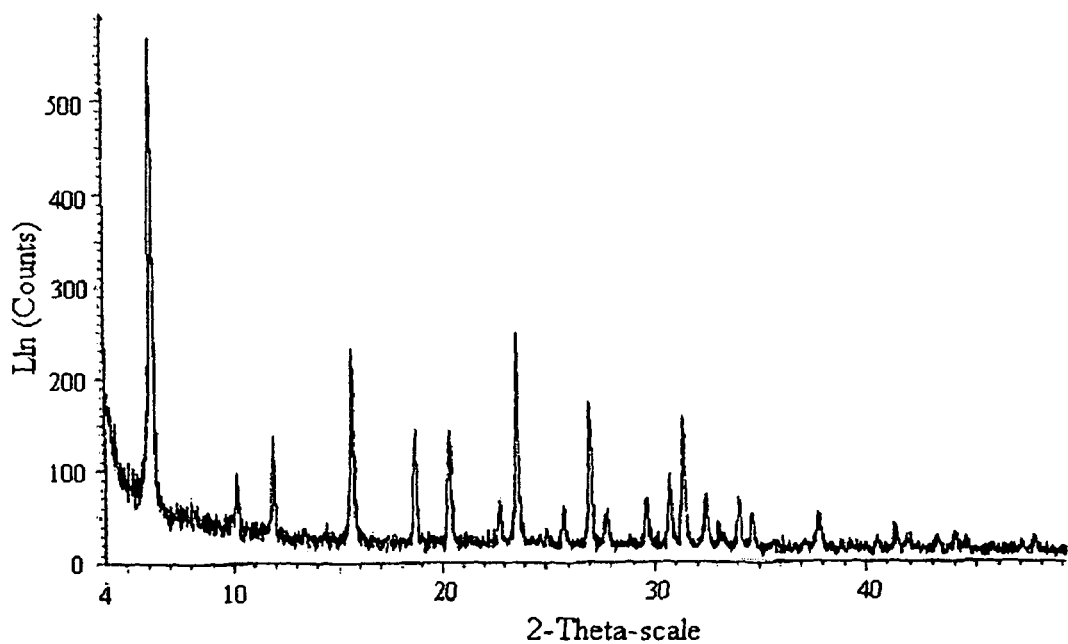

A chiral inorganic-organic composite porous material was prepared by performing ion exchange in the same manner as in Example 1 except that L-asparagine in place of L-serine was used. The results of IR and XRD analyses are shown in FIGS. 35 and 36, respectively.

TABLE 1

| Examples | $Na^+$ | $Cu^{2+}$ | Amino acids |
|---|---|---|---|
| Na-Y | 59.25 | 0.00 | — |
| 1-1 (Cu-Y) | 13.77 | 23.49 | Serine |
| 1-2 (serine-Y) | 15.47 | 0.01 | |
| 2 | 14.68 | 0.08 | Histidine |
| 3 | 6.77 | 15.02 | Cysteine |
| 4 | 16.62 | 0.02 | Alanine |
| 5 | 9.40 | 16.47 | Tryptophan |
| 6 | 7.87 | 0.24 | Glutamine |
| 7 | 13.94 | 4.62 | Arginine |
| 8 | 14.22 | 0.44 | Methionine |
| 9 | 14.90 | 0.66 | Leucine |
| 10 | 14.44 | 6.20 | Lysine |
| 11 | 10.40 | 0.24 | Glutamic acid |
| 12 | 12.52 | 9.18 | Phenylglycine |
| 13 | 16.44 | 0.06 | Proline |
| 14 | 16.27 | 0.01 | Valine |
| 15 | 13.42 | 3.74 | Phenylalanine |
| 16 | 15.18 | 0.00 | Threonine |
| 17 | 15.66 | 0.00 | Isoleucine |
| 18 | 14.72 | 0.32 | Asparagine |

Examples 19-24

Methods of Separating Isomers Using Chiral Inorganic-organic Composite Porous Materials

Example 19

A chiral stationary phase (CSP) for HPLC was manufactured using a standard slurry packer (Alltech Co , Model 1666) and a blank column (4.6×250 mm) for stainless steel HPLC. 20 ml of solvent ethanol (J. T Baker Co., HPLC grade) and 5 g of the L-serine-Y-zeolite prepared in Example 1 were mixed with each other to prepare a suspension. The suspension was filled into the blank column using the packer under a high pressure of 8000 psi for 20 minutes.

HPLC was performed using a system (Young Lin Instrument Co. Ltd.) comprising a SP930D pump equipped with an on-line degasser, a UV730D UV detector, a CTS30 RI detector and a MIDAS auto sampler, and a system (Jasco Co.) comprising a UV-975 UV detector and a PU-980 pump. The HPLC analysis results were collected using Autochro-2000 (version 1.0) software.

Ethanol as an elution was used to stabilize the column at a flow rate of 0.5 ml/min for 24 hours, and then, an elution mixture of hexane (J. T Baker Co., HPLC grade) and 2-propanol (J. T Baker Co., HPLC grade) (95:5 (v/v)) was used at a flow rate of 0.5 ml/min for 1 hour.

Figure 37:
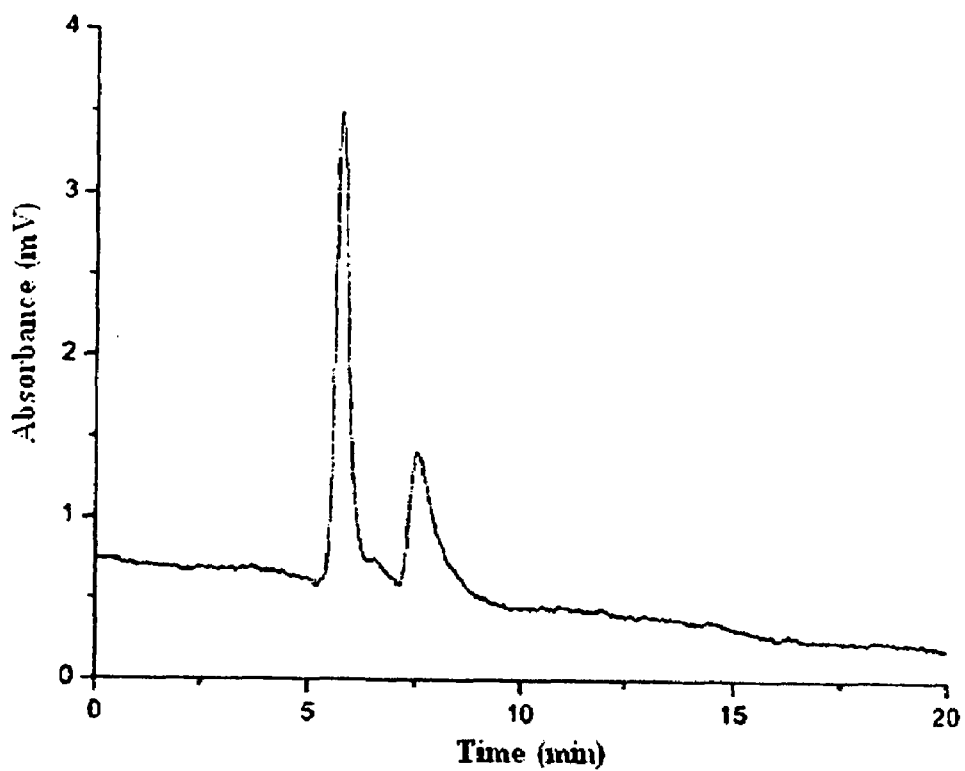
FIGS. 37 to 42 show the results of separation tests of racemates conducted in Examples 19 to 24, respectively, using chiral inorganic-organic composite porous materials prepared in the present invention.

As a racemate to be separated, ketopropene(2-(3'-benzoylphenyl)propionic acid) was used,: and as an elation, a mixture of hexane and 2-propanol (95:5 (v/v)) was used. A chromatogram was obtained at a flow rate of 0.5 ml/min and a UV detection wavelength set at 254 nm. The amount of the racemate injected was 20 µl, and the analysis was performed at a racemate concentration of 1,000 ppm. The analysis results are shown in FIG. 37.

Example 20

Figure 38:
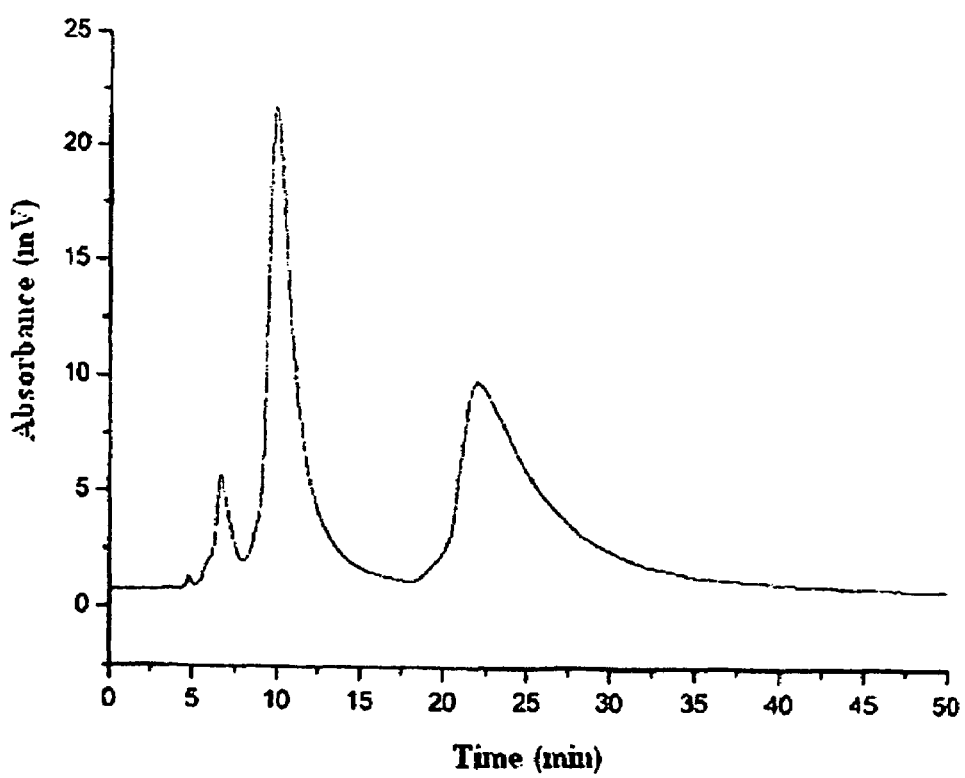

An HPLC column filled with the L-histidine-Y zeolite prepared in Example 2 was manufactured in the same manner as in Example 19. As a racemate, (2-chlorophenyl)-hydroxyacetic acid methyl ester was used, and an elution, a mixture of hexane and 2-propanol (95:5 (v/v)) was used. A chromatogram was obtained at a flow rate of 0.5 ml/min and a UV detection wavelength set at 260 nm. The amount of the racemate injected was 20 µl, and the analysis was performed at a racemate concentration of 2,400 ppm. The analysis results are shown in FIG. 38.

Example 21

Figure 39:
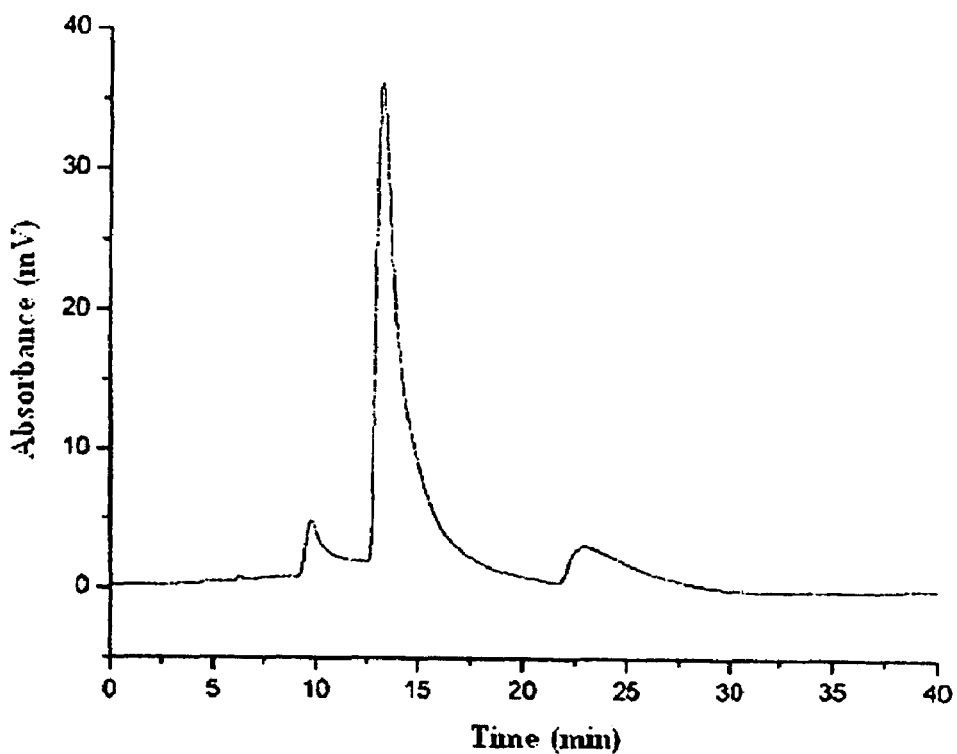

This Example was performed in the same manner as in Example 20 except that water was used as an elution, and the analysis was performed at a racemate concentration of 500 ppm. The results are shown in FIG. 39.

Example 22

Figure 40:
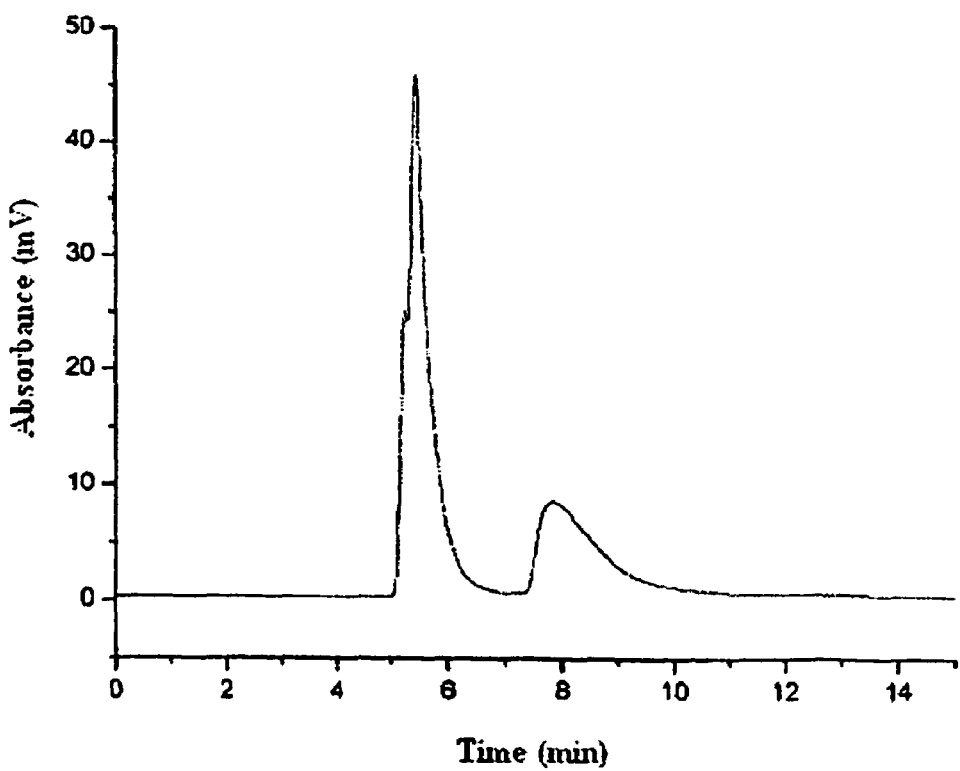

An HPLC column filled with the L-arginine-Y zeolite prepared in Example 7 was manufactured in the same manner as in Example 19. As a racemate, (2-chlorophenyl)-hydroxyacetic acid methyl ester was used, and an elution, a mixture of hexane and 2-propanol (80:20 (v/v)) was used. A chromatogram was obtained at a flow rate of 0.5 ml/min and a UV detection wavelength set at 254 nm. The amount of the racemate injected was 20 µl, and the analysis was performed at a racemate concentration of 500 ppm. The analysis results are shown in FIG. 40.

Example 23

Figure 41:
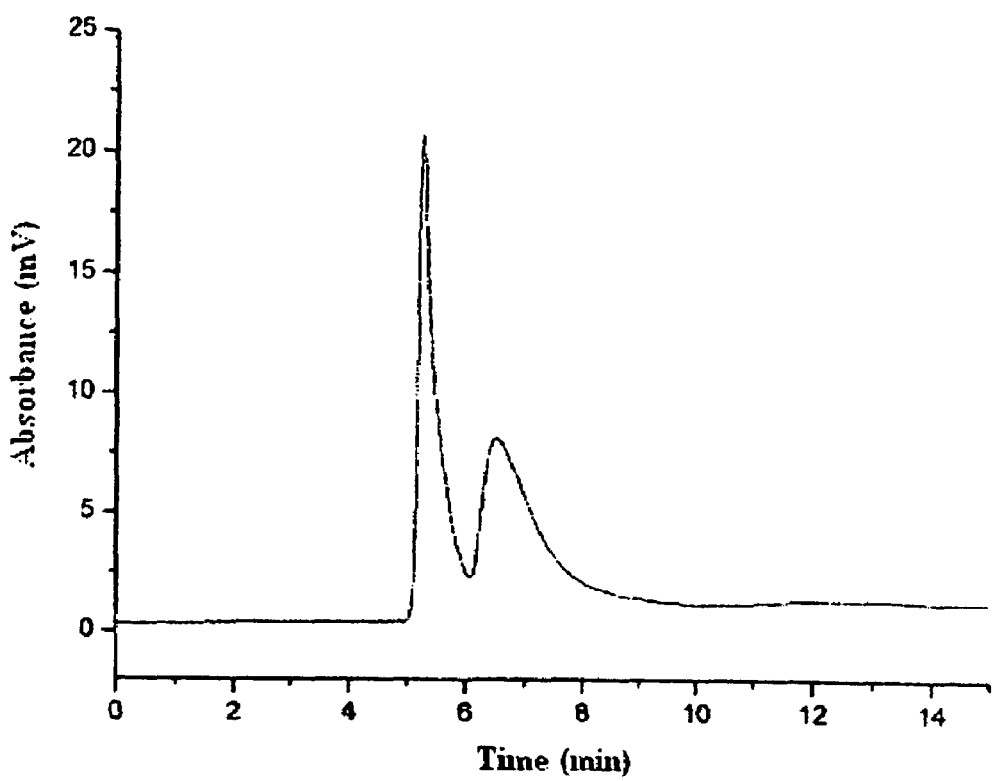

An HPLC column filled with the L-arginine-Y zeolite prepared in Example 7 was manufactured in the same manner as in Example 19. As a racemate, 2-amino-1-phenylethanol was used, and an elution, a mixture of hexane and 2-propanol (80:20 (v/v)) was used. A chromatogram was obtained at a flow rate of 0.5 ml/min and a UV detection wavelength set at 254 nm. The amount of the racemate injected was 20 µl, and the analysis was performed at a racemate concentration of 500 ppm. The analysis results are shown in FIG. 41.

Example 24

Figure 42:
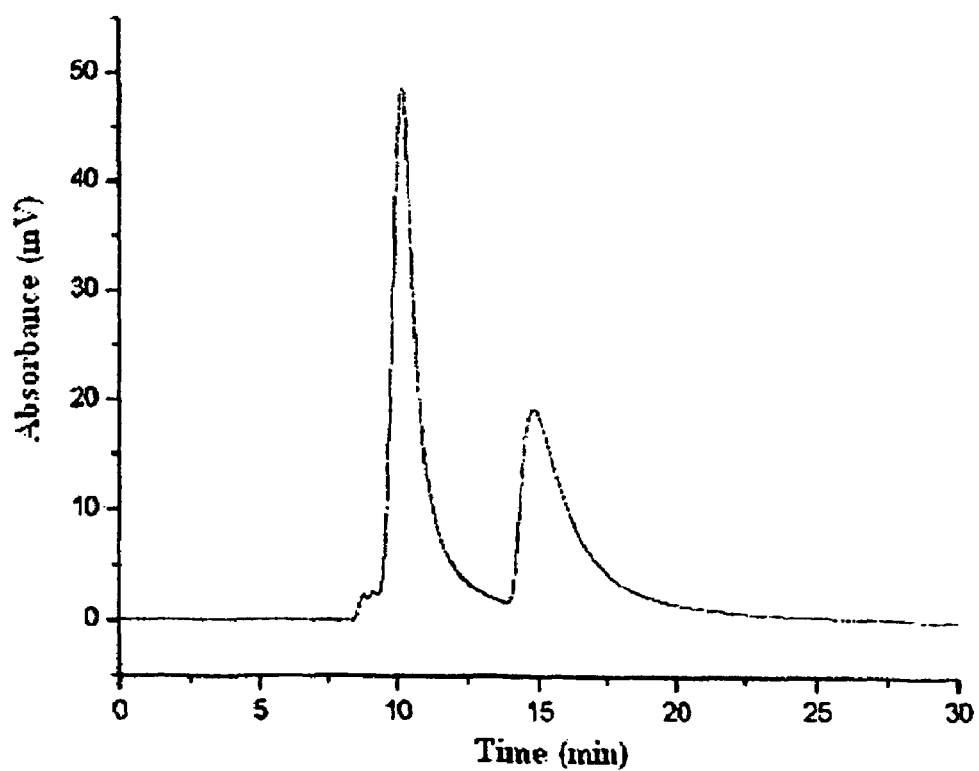

An HPLC column filled with the L-asparagine-Y zeolite prepared in Example 18 was manufactured in the same manner as in Example 19. As a racemate, 2-amino-1-phenylethanol was used, and an elution, a mixture of hexane and 2-propanol (80:20 (v/v)) was used. A chromatogram was obtained at a flow rate of 0.3 ml/min and a UV detection wavelength set at 254 nm. The amount of the racemate injected was 20 µl, and the analysis was performed at a racemate concentration of 500 ppm. The analysis results are shown in FIG. 42.

INDUSTRIAL APPLICABILITY

As can be seen from the foregoing, according to the present invention provides, the chiral inorganic-organic composite porous material can be prepared by introducing the cationic chiral organic molecules as charge-balancing cations into the porous material containing charge-balancing cations by an ion exchange process. This chiral inorganic-organic composite porous material is excellent in stability, durability, etc., and thus, will be useful as a chiral-selective catalyst and a material of separating an isomeric mixture.

The invention claimed is:
1. A method for preparing a chiral inorganic-organic composite porous material, said composite porous material consisting of an inorganic porous material containing charge-balancing cations, and a cationic chiral amino acid present in the inorganic porous material,
the method comprising
(a) providing the inorganic porous material containing charge-balancing cations;
(b) subjecting the inorganic porous material containing charge-balancing cations to ion exchange using transition metal cations; and
(c) subjecting the transition metal cations introduced into the inorganic porous material in (b) to ion-exchange using a chiral amino acid to produce the chiral inorganic-organic composite porous material wherein the chiral amino acid which is converted into cationic through the ion exchange in (c) is present in non-chiral cavities and tunnels of the porous material, and wherein the amino acid is selected from the group consisting of L-amino acids and D-amino acids, and wherein the resulting chiral inorganic-organic composite porous material does not contain a transition metal cation.

2. The method of claim 1 wherein the transition metal cations are selected from the group consisting of $Mn^{2+}$, $Co^{2+}$, $Ni^{2+}$ and $Cu^{2+}$.

3. The method of claim 1, wherein the inorganic porous material containing charge-balancing cations is selected from the group consisting of zeolite, zeolite-like material having charge-balancing cations, $In_{10}S_{18}\{1,3,4,6,7,8\text{-hexahydro-}2H\text{-primido}[1,2\text{-}\alpha]\text{pyrimidine}\}_6(H_2O)_{15}$, $In_{10}S_{18}$(dipiperidinomethane)$_3$(H$_2$O)$_7$, and [Cu$_3$(benzene-1,3,5-tricarboxylate)$_2$(H$_2$O)$_3$]$_7$.

4. The method of claim 3, wherein the zeolite is selected from the group consisting of A-zeolite, Y-zeolite, X-zeolite and L-zeolite.

5. The method of claim 3, wherein the zeolite-like material having charge-balancing cations is one where the Si or Al atom of zeolite has been substituted with an atom selected from the group consisting of Ga, Ge, Fe, Zr, Ti, Cr, B, Be, V, Zn and As.

* * * * *